US008384714B2

(12) United States Patent
De Aguiar et al.

(10) Patent No.: US 8,384,714 B2
(45) Date of Patent: Feb. 26, 2013

(54) SYSTEMS, METHODS AND DEVICES FOR MOTION CAPTURE USING VIDEO IMAGING

(75) Inventors: Edilson De Aguiar, Saarbrücken (DE); Carsten Stoll, Saarbrücken (DE); Christian Theobalt, Stanford, CA (US); Hans-Peter Seidel, Saarbrücken (DE); Sebastian Thrun, Stanford, CA (US)

(73) Assignees: The Board of Trustees of the Leland Stanford Junior University, Palo Alto, CA (US); Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 862 days.

(21) Appl. No.: 12/343,654

(22) Filed: Dec. 24, 2008

(65) Prior Publication Data
US 2009/0284529 A1    Nov. 19, 2009

Related U.S. Application Data

(60) Provisional application No. 61/052,900, filed on May 13, 2008.

(51) Int. Cl.
*G06T 17/00* (2006.01)
(52) U.S. Cl. .................................. 345/420; 345/474
(58) Field of Classification Search .............. 345/475, 345/420, 427
See application file for complete search history.

(56) References Cited

U.S. PATENT DOCUMENTS

| 2002/0145607 | A1* | 10/2002 | Dimsdale ................ 345/423 |
| 2007/0263907 | A1 | 11/2007 | McMakin et al. |
| 2008/0031512 | A1 | 2/2008 | Mundermann et al. |
| 2008/0100622 | A1* | 5/2008 | Gordon .................... 345/427 |
| 2008/0180448 | A1* | 7/2008 | Anguelov et al. ........... 345/475 |

OTHER PUBLICATIONS

Stoll et al (Template Deformation for Point Cloud Fitting, 2006, The Europgraphics Association).*
de Aguiar et al (Marker-less 3D Feature Tracking for Mesh-based Human Motion Capture, 2007, In 2nd workshop on human motion, ICCV 07).*
Takahashi et al (Curve and Surface Design Using Multiresolution constraints, 1997, IEEE).*
Zhou et al (Large Mesh Deformation Using the Volumetric Graph Laplacian, 2005).*
Cutler et al (Simplification and improvement of tetrahedral models for simulation, 2004).*
Bickel et al. *Multi-scale capture of facial geometry and motion*. In Proc. of SIGGRAPH 33, vol. 26, Issue 3, 10 pgs. (Jul. 2007).
Botsch et al. *On linear variational surface deformation methods*. IEEE Transactions on Visualization and Computer Graphics, vol. 14, Issue 1, pp. 213-230 (Jan. 2008).

(Continued)

*Primary Examiner* — Daniel Washburn
*Assistant Examiner* — Kyle Zhai
(74) *Attorney, Agent, or Firm* — Crawford Maunu PLLC

(57) ABSTRACT

A variety of methods, devices and storage mediums are implemented for creating digital representations of figures. According to one such computer implemented method, a volumetric representation of a figure is correlated with an image of the figure. Reference points are found that are common to each of two temporally distinct images of the figure, the reference points representing movement of the figure between the two images. A volumetric deformation is applied to the digital representation of the figure as a function of the reference points and the correlation of the volumetric representation of the figure. A fine deformation is applied as a function of the coarse/volumetric deformation. Responsive to the applied deformations, an updated digital representation of the figure is generated.

27 Claims, 16 Drawing Sheets

OTHER PUBLICATIONS

Byrd et al. *A limited memory algorithm for bound constrained optimization.* SIAM Journal of Scient. Computing, vol. 16, No. 5 (1995). Abstract only.

Carranza et al. *Free-viewpoint video of human actors.* ACM Transactions on Graphics, vol. 22, No. 3, pp. 569-577 (Jul. 2003).

de Aguiar et al. *Marker-less 3D feature tracking for mesh-based human motion capture.* In 2nd Workshop on Human Motion. ICCV'07, Rio de Janeiro, Brazil, pp. 1-15 (2007).

de Aguiar et al. *Automatic conversion of mesh animations into skeleton based animations.* Computer Graphics Forum (Proc. EurographicsEG 08) 27, 2 (4) pp. 389-397 (2008).

de Aguiar et al. *Performance capture from sparse multi-view video.* Int'l Conference on Computer Graphics and Interactive Techniques, No. 98, pp. 1-10 (2008).

Goesele et al. Multiview stereo revisited. Computer Vision and Pattern Recognition, IEEE Computer Society Conference, vol. 2, pp. 2402-2409 (2006).

Kazhdan et al. *Poisson Surface Reconstruction.* Eurographics Symposium on Geometry Proceedings, 10 pgs. (2006).

Leordeanu et al. *A spectral technique for correspondence problems using pairwise constraints.* Computer Vision, ICCV 2005. Tenth IEEE International Conf., vol. 2, pp. 1482-1489 (Oct. 2005).

Lowe, D.G. *Object recognition from local scale-invariant features.* In Proc. ICCV, vol. 2, pp. 1-8 (1999).

Müller et al. Stable real-time deformations. In Proc. of SCA, ACM, pp. 49-54 (2002).

Seitz et al. *A comparison and evaluation of multi-view stereo reconstruction algorithms.* Proceed. of the 2006 IEEE Computer Society Conf. on Computer Vision and Pattern Recognition, pp. 519-528 (2006).

Sorkine et al. *As-rigid-as possible surface modeling.* Eurographics Symposium on Geometry Processing, 8 pgs. (2007).

Stoll et al. *Template deformation for point cloud fitting.* Eurographics Symposium on Geometry Processing, 9 pgs. (2006).

Yamauchi et al. *Mesh segmentation driven by Gaussian curvature.* Visual Computer, vol. 21, Nos. 8-10, pp. 659-668 (Sep. 2005).

\* cited by examiner

SYSTEMS, METHODS AND DEVICES FOR MOTION CAPTURE USING VIDEO IMAGING

RELATED PATENT DOCUMENTS

The present invention claims the benefit, under 35 U.S.C. §119(e), of U.S. Provisional Patent Application Ser. No. 61/052,900, entitled "Systems, Methods and Devices for Motion Capture Using Multi-View Video" and filed on May 13, 2008, this patent document, which includes the Appendix therewith, is fully incorporated herein by reference.

FIELD OF THE INVENTION

The present invention relates to the field of motion capture and to algorithms that facilitate the capture of a subject, such as by tracking and recording humans, animals and other objects in motion.

BACKGROUND

The recently released photo-realistic CGI movie Beowulf provides an impressive foretaste of how many movies will be produced as well as displayed in the future (Paramount 2007). In contrast to previous animated movies, the goal was not the creation of a cartoon style appearance but a photo-realistic display of the virtual sets and actors. It still takes a tremendous effort to create authentic virtual doubles of real-world actors. It remains one of the biggest challenges to capture human performances, i.e., motion and possibly dynamic geometry of actors in the real world in order to map them onto virtual doubles. To measure body and facial motion, the studios resort to marker-based optical motion capture technology. Although this delivers data of high accuracy, it has a number of limitations. Marker-based motion capture requires a significant setup time, expects subjects to wear unnatural skin-tight clothing with optical beacons, and often makes necessary many hours of manual data cleanup. In this regard, the studios are unable to capture human performances densely in space and time where there would be an accurate capture of dynamic shape, motion and textural appearance of actors in arbitrary everyday apparel.

Many recent motion capture algorithms have largely focused on capturing sub-elements of the sophisticated scene representation that are the subject of reconstruction. Marker-based optical motion capture systems are the workhorses in many game and movie production companies for measuring motion of real performers. The high accuracy of this approach comes at the price of restrictive capturing conditions and the typical requirement of the subjects to wear skin-tight body suits and reflective markings; such conditions make it infeasible to capture shape and texture. Others have attempted to overcome these conditions by using several hundred markers to extract a model of human skin deformation. While their animation results are very convincing, manual mark-up and data cleanup times can be tremendous in such a setting, and generalization to normally dressed subjects is difficult. Such marker-based approaches, by definition, require the scene to be modified by the burdensome inclusion of the markers.

Marker-less motion capture approaches are designed to overcome some restrictions of marker-based techniques and enable performance recording without optical scene modification. Although such approaches are more flexible than the intrusive (marker-based) methods, they have difficulty achieving the same level of accuracy and the same application range. Furthermore, since such approaches typically employ kinematic body models, it is hard to capture motion, let alone detailed shape, of people in loose everyday apparel. Some methods try to capture more detailed body deformations in addition to skeletal joint parameters by adapting the models closer to the observed silhouettes, or by using captured range scan. But such algorithms generally require the subjects to wear tight clothes. Only a few approaches aim at capturing humans wearing more general attire, for example, by jointly relying on kinematic body and cloth models. Unfortunately, these methods typically require handcrafting of shape and dynamics for each individual piece of apparel, and they focus on joint parameter estimation under occlusion rather than accurate geometry capture. Other related work explicitly reconstructs highly-accurate geometry of moving cloth from video. Such methods also use visual interference with the scene in the form of specially tailored color patterns on each piece of garment which impedes simultaneous acquisition of shape and texture.

A slightly more focused but related concept of performance capture is put forward by 3D video methods which aim at rendering the appearance of reconstructed real-world scenes from new synthetic camera views never seen by any real camera. Early shape-from-silhouette methods reconstruct rather coarse approximate 3D video geometry by intersecting multi-view silhouette cones. Despite their computational efficiency, the moderate quality of the textured coarse scene reconstructions often falls short of production standards in the movie and game industry. To boost 3D video quality, researchers experimented with image-based methods, multi-view stereo, multi-view stereo with active illumination, or model-based free-viewpoint video capture. The first three methods do not deliver spatio-temporally coherent geometry or 360 degree shape models, which are both essential prerequisites for animation post-processing. At the same time, previous kinematic model-based 3D video methods were not well suited to capture performers in general clothing. Data-driven 3D video methods synthesize novel perspectives by a pixel-wise blending of densely sampled input viewpoints. While even renderings under new lighting can be produced at high fidelity, the complex acquisition apparatus requiring hundreds of densely spaced cameras makes practical applications often difficult. The lack of geometry makes subsequent editing a major challenge.

More recent animation design, animation editing, deformation transfer and animation capture methods have been proposed that are no longer based on skeletal shape and motion parameterization but rely on surface models and general shape deformation approaches. This abandonment of kinematic parameterizations makes performance capture a much harder problem.

Similarly, certain other approaches enable mesh-based motion capture from video, which involves generation of a 3D (or volumetric) deformable model, and also employ laser-scanned models and a more basic shape deformation framework. Another recent approach is based on animation reconstruction methods that jointly perform model generation and deformation capture from scanner data. However, their problem setting is different and computationally very challenging which makes it hard for them to generate high visual quality. Other approaches have proposed techniques that are able to deform mesh-models into active scanner data or visual hulls, respectively.

SUMMARY

The present invention is directed to systems, methods and/or animation software packages involving video-based performance capture and, in many embodiments, provides for passive reconstruction of spatio-temporally coherent shape, motion and texture. These and other aspects of the present invention are exemplified in a number of illustrated implementations and applications, some of which are shown in the figures and characterized in the claims section that follows.

According to another aspect of the present invention, a performance is first captured for construction of a deformation model in a multi-resolution way, e.g., a global-model pose is inferred using a lower-detail model by using both a low-resolution tracking approach and a technique to estimate or infer detail. Thereafter, smaller-scale shape and motion detail is estimated based on a high-quality model.

According to another aspect of the present invention, an arrangement of video-data processors (integrated with or separate from one or more cameras or recording tools) captures from (largely or completely) unmodified video streams the coherent dynamic geometry of one or more performers wearing arbitrary apparel. This input data is used to recover coarse model poses of each such performer with motion constraints extracted from this data to provide a deformation (mathematical) model which can be applied to estimated motions of the performer, and this model is used as a guide in providing (surface) detail recovery, e.g., for shape refinement.

More specific embodiments of the present invention involve video-based performance capture that passively reconstructs spatio-temporally coherent shape, motion and texture of actors at high quality by using an effective combination of skeleton-less shape deformation methods, an analysis-through-synthesis framework for pose recovery, and a model-guided (surface) detail recovery approach for shape refinement. In this regard, many applications are benefited by allowing the user to record people wearing loose apparel and people performing fast and complex motion. The capture of shape, motion and texture of people wearing everyday apparel can be simultaneous.

An embodiment of the present invention is directed to a processor configured and arranged to implement a method, a storage medium containing instructions that when executed perform the following method. The method involves generating a digital representation (R) of a figure by correlating a visual image of the figure with three-dimensional information about the figure, the digital representation of the figure including a surface mesh of the figure and a volumetric representation of the figure using a plurality of three-dimensional shapes; finding, using markerless capture, reference points that are common to each of two temporally distinct visual images of the figure, the reference points representing movement of the figure between the two images; deforming, in response to positional constraints placed on the movement of the plurality of three-dimensional shapes between the two images, the volumetric representation of the figure as a function of the reference points to allow for characterization of three-dimensional movement of the plurality of three-dimensional shapes; deforming the surface mesh of the figure as a function of the volumetric deformation; and generating, responsive to the deformed surface mesh and to the deformed volumetric representation of the figure, an updated digital representation of the figure.

The above summary is limited to characterizing certain aspects and is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

Figure 1:
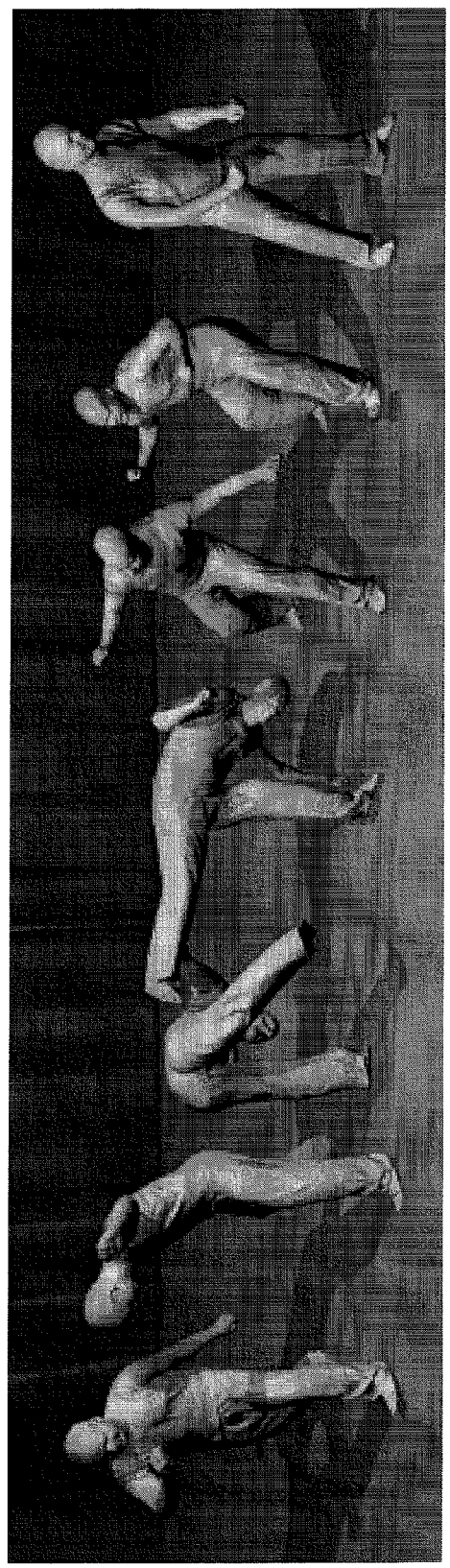
FIG. 1 shows a sequence of poses captured from eight video recordings of a capoeira turn kick, consistent with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for capturing and reconstructing movement of images such as video-based performances of real-life subjects, whether human, animal or otherwise. Specific applications of the present invention facilitate passive reconstruction of spatio-temporally coherent shape, motion and texture, for a live performance. As many aspects of the example embodiments disclosed herein relate to and significantly build on previous developments in this field, the following discussion summarizes such previous developments to provide a solid understanding of the foundation and underlying teachings from which implementation details and modifications might be drawn. It is in this context that the following discussion is provided and with the teachings in these references incorporated herein by reference. While the present invention is not necessarily limited to such applications, various aspects of the invention may be appreciated through a discussion of various examples using this context.

According to an embodiment of the present invention, a performance is first captured for construction of a deformation model in a multi-resolution way, e.g., by using both low-resolution tracking approach and another technique to estimate, or infer detail of, a global-model pose and is inferred using a lower-detail model. Thereafter, smaller-scale shape and motion detail is estimated based on a high-quality model.

A specific embodiment of the present invention relates to the following processor implemented steps:

generating a digital representation (R) of a figure by correlating a visual image of the figure with three-dimensional information about the figure, the digital representation of the figure including a surface mesh of the figure and a volumetric representation of the figure using a plurality of three-dimensional shapes;

finding, using markerless capture, reference points that are common to each of two temporally distinct visual images of the figure, the reference points representing movement of the figure between the two images;

deforming, in response to positional constraints placed on the movement of the plurality of three-dimensional shapes between the two images, the volumetric representation of the figure as a function of the reference points to allow for characterization of three-dimensional movement of the plurality of three-dimensional shapes;

deforming the surface mesh of the figure as a function of the volumetric deformation; and generating, responsive to the deformed surface mesh and to the deformed volumetric representation of the figure, an updated digital representation of the figure.

Other, specific embodiments of the present invention involve one or more of the following processor-implemented steps:

Generating or receiving an initial 3D shape model of the captured subject, R, that describes the geometry of the subject in a reference pose. The model includes a dense set of 3D points P on the surface of R as well as the connectivity between the points on the surface (e.g. as a polygonal surface) where a pose of this model is defined via 3D coordinates for each point in P.

Generating or using a coarser (less dense) volumetric version V of R that represents the subject's shape in the reference pose as a tetrahedral mesh. The model includes a set of (tetrahedron) vertices Q where a pose of this model is defined by a 3D coordinate for each point in Q.

Generating or using a mathematical deformation model that describes the deformations of the coarse model V under a set of point constraints. Another mathematical deformation model describes the deformation of R under a set of point constraints. 3D point constraints define the location, of a subset of surface points of R, in a new deformed configuration.

Generating or using a captured performance model M that describes the geometry and (optionally) textural appearance of the captured subject at each time step of motion. The model M has a set of point three-dimensional positions for all points P of R at each time step of a performance. The model M also has a set of positions for each vertex Q of V.

Generating or using a representation I of the real world subject's motion and appearance at each time step. This generation can be obtained from sensor measurements. The model I has time-varying multi-view image data of the subject. This time-varying multi-view data can be recorded by video cameras or by other sensor types capable of conveying three-dimensional information. The model I can also include a set of features F that are extracted from the input (video) footage. The features F describe correspondence between surface points of the subject between time steps of video. The model I can also include features describing the posture and detailed surface appearance of the subject at each time step, i.e., silhouette data, as well as 3D points in space reconstructed via multi-view correspondence search.

Using or receiving data from a marker-less tracking method that estimates the animation model M from the input (video) data without the application of fiducial markers, such as optical or electronic markings; thereby estimating the parameters of M by aligning it with the representation of the real world subject I.

Using or receiving data from a marker-less tracking approach that first captures the coarse pose of a subject at each time step by finding the optimal deformation for V such that I is best explained. Using or receiving data from a marker-less tracking approach that, starting off the coarse-pose estimate, computes a detailed surface estimate at each time step of a performance using the fine surface model R, and thereby generating the performance animation model M.

More specific embodiments of the present invention involve video-based performance capture that passively reconstructs spatio-temporally coherent shape, motion and texture of actors at high quality by using an effective combination of skeleton-less shape deformation methods, an analysis-through-synthesis framework for pose recovery, and a model-guided (surface) detail recovery approach for shape refinement. In this regard, many applications can be benefited by applying aspects of the present invention that facilitate recording and computer modeling of people wearing loose apparel and of people performing fast and complex motions. Thus, the capture of shape, motion and texture of people wearing everyday apparel can be simultaneous.

In yet more specific example embodiments, the invention is directed to use of an analysis-through-synthesis tracking framework, volumetric deformation technique, and thereafter, recovery of small-scale dynamic surface detail. The analysis-through-synthesis tracking framework enables capturing of motion that shows a level of complexity and speed which would have been impossible to recover with previous flow-based or flow- and feature-based methods. The volumetric deformation technique greatly increases robustness of pose recovery, and small-scale dynamic surface detail is recovered after developing the deformation model, e.g., by applying model-guided multi-view stereo or 3D optical flow.

In yet other specific example embodiments, aspects of the present invention are implemented using a marker-less dense performance capture technique. Using a small number of multi-view video recordings (e.g., as few as about 3-8) of a performer moving in his normal and even loose or wavy clothing, the technique provides adequately detailed reconstruction of his motion and his spatio-temporally coherent time-varying geometry (i.e., geometry with constant connectivity) to capture even subtle deformation detail. As an optional implementation detail, the abdication of any form of optical marking also makes simultaneous shape and texture acquisition straightforward.

Other specific example embodiments can achieve a high level of flexibility and versatility without requiring traditional skeletal shape or motion parameterization and by posing performance capture as deformation capture. For scene representation, certain embodiments employ, for example, a detailed static laser scan of the subject to be recorded or 3D optical flow. Performances are captured in a multi-resolution way, e.g., first global model pose is inferred using a lower-detail model (as discussed below), and thereafter smaller-scale shape and motion detail is estimated based on a high-quality model (as discussed below). Global pose capture employs an analysis-through-synthesis procedure that robustly extracts, from the input footage, a set of position constraints. These are fed into an efficient physically plausible shape deformation approach (as discussed below), in order to make the scan mimic the motion of its real-world equivalent. After global pose recovery in each frame, a model-guided multi-view stereo and contour alignment method reconstructs finer surface detail at each time step. This approach can reliably reconstruct very complex motion exhibiting speed and dynamics that would even challenge the limits of traditional skeleton-based optical capturing approaches (as discussed below).

According to an embodiment of the present invention, input data of the subject is taken prior to video-recording human performances. This can be achieved for example, by a full-body laser scan of the subject in its current apparel by means of a Vitus Smart™ laser scanner. After scanning, the subject immediately moves to the adjacent multi-view recording area. The experimental multi-view capturing apparatus discussed hereafter features K (where K=8) different synchronized geometrically and photometrically calibrated video cameras running at 24 fps and providing 1004×1004 pixels frame resolution. The cameras are placed in an approximately circular arrangement around the center of the scene. As part of pre-processing color-based background subtraction is applied to all video footage to yield silhouette images of the captured performers.

Figure 2A:
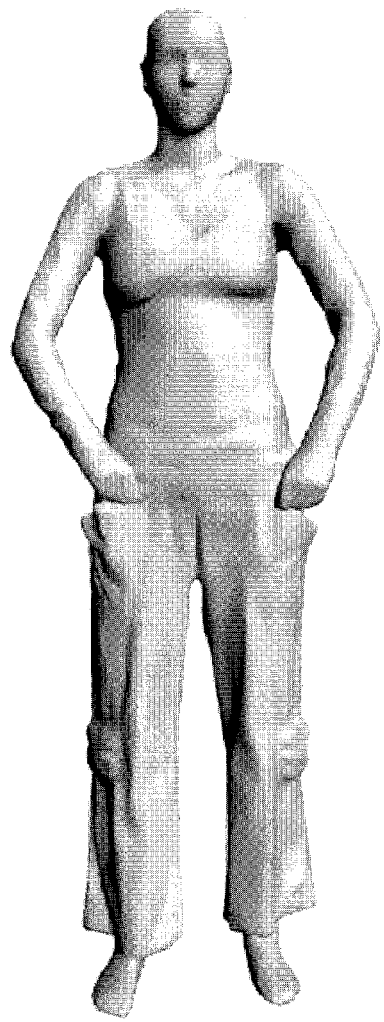
FIG. 2a shows a surface scan $T_{tet}$ of an actress.
Figure 2B:
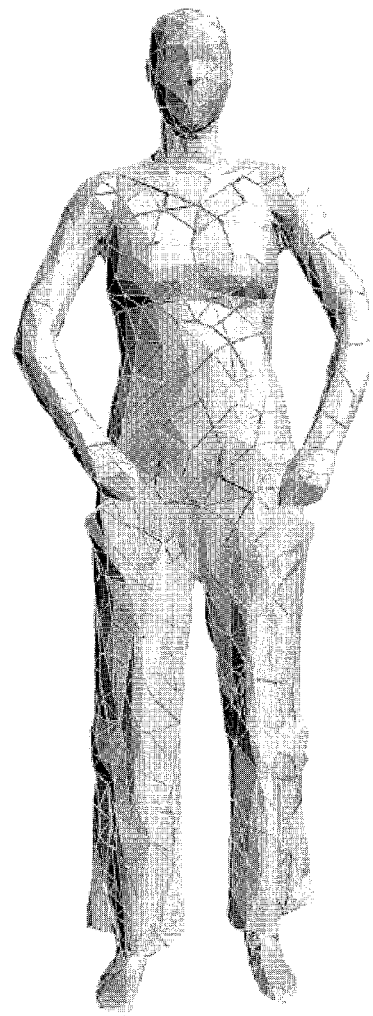
FIG. 2b shows a tetrahedral mesh $T_{tet}$ that corresponds to the image of FIG. 2a, in an exploded view, consistent with an embodiment of the present invention.

Once all of the data has been captured, an automatic performance reconstruction pipeline commences. Surprisingly, this reconstruction pipeline can be implemented with little or no manual interaction during pre-processing. To obtain a computational model of shape and motion, the raw scan is transformed into a high-quality surface mesh $T_{tri}=(V_t,Tt_n)$ with ns vertices $V_{tri}=\{v1 \ldots v_{ns}\}$ and $m_s$ triangles $T_{tri}=\{t1 \ldots t_{ms}\}$ (see FIG. 2(a)). For further details on such a method reference can be made to KAZHDAN, M., BOLITHO, M., AND HOPPE, H. (2006) *Poisson surface reconstruction* In Proc. SGP, 61-70, which is fully incorporated herein by reference. Additionally, a coarser tetrahedral version of the surface scan $T_{tet}=(V_{tet},T_{tet})$ (comprising of $n_t$ vertices $V_{tet}$ and $m_t$ tetrahedrons $T_{tet}$) is created by applying a quadric error decimation and a subsequent constrained Delaunay tetrahedralization (see FIG. 2b). Typically, $T_{tri}$ contains between 30000 and 40000 triangles, and the corresponding tet-version between 5000 and 6000 tetrahedrons. Both models are automatically registered to the first pose of the actor in the input footage by means of a procedure based on iterative closest points (ICP). Pose initialization can be simplified by having the actor strike, in the first frame of video, a pose similar to the pose that she/he held during the volumetric scan. This can reduce differences between the first video image and the scan image, thereby simplifying correlation therebetween.

Embodiments of the present invention use a deformable model for scene representation. Aspects of the present invention do not use any skeletal motion parameterization and resort to a deformable model as scene representation; thereby, presenting a harder tracking problem but gaining an intriguing advantage in being able to track nonrigidly deforming surfaces (like wide clothing or loose hair) in a manner similar to that of rigidly deforming models and not requiring prior assumptions about material distributions or the segmentation of a model. For instance, loose or wide clothing of a person can move in manners that do not track well with the skeleton of the person. Aspects of the present invention allow for tracking of such non-rigidly deforming portions of the person even where the non-rigidly deforming portions are able to move substantially independently from rigidly deforming portions of the person. Thus, non-rigidly deforming portions of a figure can move in directions opposite to underlying rigidly deforming portions of the figure, exhibit significant compression or expansion and/or exhibit movement after the rigidly deforming portions of the figure have ceased to move.

In a particular implementation, an algorithmic ingredient of mesh-based performance capture is a fast and reliable shape deformation framework that expresses the deformation of the whole model based on a few point handles. In one instance, performances/movements of a figure/actor are captured in a multi-resolution way to increase reliability. First, an analysis-through-synthesis method based on image and silhouette cues estimates the global pose of an actor at each frame on the basis of the lower-detail tetrahedral input model. The sequence of processing steps is designed to enable reliable convergence to plausible poses despite the highly multimodal solution space of optimization-based mesh deformation. Once global poses are found, the high-frequency aspect of performances is captured. For instance, the motion of folds in a skirt is recovered in this step. To this end the global poses are transferred to the high-detail surface scan, and surface shape is refined by enforcing contour alignment and performing model-guided stereo.

The output of the method is a dense representation of the performance in both space and time. The output includes accurately deformed spatio-temporally coherent geometry that nicely captures the liveliness, motion and shape detail of the original input.

In connection with the above-mentioned embodiment, the performance capture technique can use two variants of Laplacian shape editing. For example, low-frequency tracking is implemented using an iterative volumetric Laplacian deformation algorithm. This deformation algorithm is based on the tetrahedral mesh $T_{tet}$, which facilitates inferring of rotations from positional constraints and also implicitly encoding of prior knowledge about shape properties that are to be preserved, such as local cross-sectional areas. For recovery of high-frequency surface details, the captured pose of $T_{tet}$ can be transferred to the high-resolution surface scan. Being already roughly in the correct pose, a simpler non-iterative variant of surface-based Laplacian deformation can be used to infer shape detail from silhouette and stereo constraints.

In one implementation, the tetrahedral mesh $T_{tet}$ is deformed under the influence of a set of position constraints $v_j \approx q_j$, $j \in \{1, \ldots, n_c\}$ by iterating a linear Laplacian deformation step and a subsequent update step to compensate the (mainly rotational) errors introduced by the nature of the linear deformation. This procedure can be useful for reducing the amount of non-rigid deformation each tetrahedron undergoes, and thus exhibits qualities of an elastic deformation. For further background details on triangular mesh construction algorithm reference can be made to SORKINE, O., AND ALEXA, M. (2007) *As-rigid-as-possible surface modeling* In Proc. SGP, 109-116, which is fully incorporated herein by reference; however, the use of a tetrahedral construction (i.e., rather than a triangle mesh construction) allows for certain shape properties, such as cross-sectional areas, to be implicitly preserved after deformation. The latter can be particularly useful for increasing tracking robustness since non-plausible model poses (e.g., due to local flattening) are far less likely.

In connection with certain embodiments and in accordance with specific aspects of the present invention, a deformation technique is based on solving the tetrahedral Laplacian system $Lv = \delta$ with $$L = G^T D G, \quad (1)$$

and $$\delta = G^T D g \quad (2)$$

where G is the discrete gradient operator matrix for the mesh, D is a 4 $m_t \times 4 m_t$ diagonal matrix containing the tetrahedra's volumes, and g is the set of tetrahedron gradients, each being calculated as $g_j = G_j p_j$. For background details on deformation techniques, reference may be made to BOTSCH, M., AND SORKINE, O. (2008) *On linear variational surface deformation methods* IEEE TVCG 14, 1, 213-230, which is fully incorporated herein by reference. Here, $p_j$ is a matrix containing the vertex coordinates of tetrahedron $t_j$. The constraints $q_j$ can be factorized into the matrix L by eliminating the corresponding rows and columns in the matrix and incorporating the values into the right-hand side $\delta$.

The following steps are now iterated:

Linear Laplacian deformation: By solving the above system a set of new vertex positions $V'_{tet} = \{v'_1 \ldots v'_{nt}\}$ is obtained. Due to the linear formulation, this deformed model exhibits artifacts common to all simple Laplacian techniques, i.e. the local elements do not rotate under constraints but rather simply scale and shear to adjust to the desired pose.

Rotation extraction: A transformation matrix $T_i$ is then extracted for each tetrahedron which brings $t_i$ into configuration $t'_i$. These transformations can be further split up into a rigid part $R_i$ and a non-rigid part Si using polar decomposition. Keeping only the rotational component removes the non-rigid influences of the linear deformation step from the local elements.

Differential update: Next, the right hand side $\delta$ is updated using Eq. (2) by applying the rotations $R_i$ to the gradients of the tetrahedron.

Iterating this procedure minimizes the amount of non-rigid deformation $S_i$ remaining in each tetrahedron. Henceforth, this deformation energy is referred to as $E_D$. While subsequent tracking steps could be implemented with a variety of physically plausible deformation or simulation methods or techniques, aspects of the present invention are particularly useful to the reconstruction by being extremely fast, being very easy to implement, and producing plausible results even if material properties are unknown. For background information on such physically plausible deformation or simulation methods reference can be made to BICKEL, B., BOTSCH, M., ANGST, R., MATUSIK, W., OTADUY, M., PFISTER, H., AND GROSS, M. (2007) *Multi-scale capture of facial geometry and motion*. In Proc. of SIGGRAPH, 33, and to MULLER, M., DORSEY, J., MCMILLAN, L., JAGNOW, R., AND CUTLER, B. (2002) *Stable real-time deformations* In Proc. of SCA, ACM, 49-54, which are each fully incorporated by reference herein.

To transfer a pose from $T_{tet}$ to $T_{tri}$, the position of each vertex $v_i$ in $T_{tri}$ is expressed as a linear combination of vertices in $T_{tet}$. These coefficients $c_i$ are calculated for the rest pose and can be used afterwards to update the pose of the triangle mesh.

The linear coefficients $c_i$ can be generated by finding the subset $T_r(v_i)$ of all tetrahedra from $T_{tet}$ that lie within a local spherical neighborhood of radius r (in all the cases r was set to 5% of the mesh's bounding box diagonal) and contain a boundary face with a face normal similar to that of vi. Subsequently, the (not necessarily positive) barycentric coordinate coefficients $c_i(j)$ of the vertex are calculated with respect to all $t_j \in T_r(v_i)$ and combine them into one larger coefficient vector $c_i$ as $$c_i = \frac{\sum_{t_j \in T_r(v_i)} c_i(j) \phi(v_i, t_j)}{\sum_{t_j \in T_r(v_i)} \phi(v_i, t_j)}.$$

$\phi(v_i, t_j)$ is a compactly supported radial basis function with respect to the distance of $v_i$ to the barycenter of tetrahedron $t_j$. This weighted averaging ensures that each point is represented by several tetrahedra and thus the deformation transfer from tetrahedral mesh to triangle mesh will be smooth. The coefficients for all vertices of $T_{tri}$ are combined into a matrix B. Due to the smooth partition of unity definition and the local support of the parameterization, the mesh can be quickly computed in its transferred pose $V'_{tri}$ by multiplying the current vertex positions of the current tetrahedral mesh $V_{tet}$ with B.

To perform surface-based deformation, a least-squares Laplacian system is implemented. For background information on least-squares Laplacian systems reference can be made to BOTSCH, M., AND SORKINE, O. (2008) *On linear variational surface deformation methods* IEEE TVCG 14, 1, 213-230, which is fully incorporated herein by reference. Given the triangle mesh $T_{tri}$ a discrete least-squares Laplacian system is applied using cotangent weights to deform the surface under the influence of a set of position constraints $v_j = q_j, j \in \{1, \ldots, n_c\}$. This can be achieved by minimizing the energy $$\operatorname*{argmin}_{v}\{\|Lv - \delta\|^2 + \|Cv - q\|^2\}. \quad (3)$$

Here, L is the cotangent Laplacian matrix, $\delta$ are the differential coordinates, and C is a diagonal matrix with non-zero entries $C_{j,j} = w_j$ only for constrained vertices $v_j$ (where $w_j$ is the weight of the additional entry). This formulation uses the Laplacian as a regularization term for the deformation defined by the constraints.

For certain embodiments disclosed herein, the first step aims at recovering, for each time step of video, a global pose of the tetrahedral input model that matches the pose of the real actor. In a nutshell, it can be said that this global pose extraction method involves computing deformation constraints from each pair of subsequent multi-view input video frames at times t and t+1. The volumetric shape deformation procedure is then applied to modify the pose of $T_{tet}$ at time t (that was found previously) until the pose aligns with the input data at time t+1. To converge to a plausible pose under this highly multi-modal goodness-of-fit criterion, it is important that the right types of features are extracted from the images in the right sequence and the resulting deformation constraints are applied in the correct order.

To serve this purpose, the pose recovery process begins with the extraction of 3D vertex displacements from reliable image features which brings the model close to its final pose even if scene motion is rapid. The distribution of 3D features on the model surface is dependent on scene structure, e.g., texture, and can, in general, be non-uniform or sparse. Therefore, the resulting pose may not be entirely correct. Furthermore, potential outliers in the correspondences make additional pose update steps unavoidable. Therefore, two additional steps are implemented that exploit silhouette data to fully recover the global pose. The first step refines the shape of the outer model contours until they match the multi-view input silhouette boundaries. The second step optimizes 3D displacements of key vertex handles until optimal multi-view silhouette overlap is reached. The multi-view silhouette overlap can be quickly computed as an XOR operation on the GPU.

Further tracking robustness can be gained by subdividing the surface of the volume model into a set R of approximately 100-200 regions of similar size during pre-processing. For background information on subdivision of a volume model during pre-processing reference can be made to YAMAUCHI, H., GUMHOLD, S., ZAYER, R., AND SEIDEL, H.-P. (2005) *Mesh segmentation driven by gaussian curvature* Visual Computer 21, 8-10, 649-658, which is fully incorporated herein by reference. Rather than inferring displacements for each vertex, the representative displacements for each region can be determined as explained supra.

Aspects of the present invention relate to pose initialization from image features. Given two sets of multi-view video frames $I_1(t), \ldots, I_k(t)$ and $I_1(t+1), \ldots, I_k(t+1)$ from subsequent time steps, a first processing step extracts Scale-invariant feature transform (SIFT) features in each frame (see FIG. 3). For background information on SIFT feature extraction, reference can be made LOWE, D. G. (1999) *Object recognition from local scale-invariant features* In Proc. ICCV, Vol. 2, 1150ff, which is fully incorporated herein by reference. This yields for each camera view k and either time step a list of $l(k) = 1, \ldots, L_k$ 2D feature locations $u_{k,t}^{l(k)}$ along with their SIFT feature descriptors $dd_{k,t}^{l(k)}$—henceforth each such list is referred to as $LD_{k,t}$. SIFT features are largely invariant under illumination and out-of-plane rotation and enable reliable correspondence finding even if the scene motion is fast.

Let $T_{tet}(t)$ be the pose of $T_{tet}$ at time t. To transform feature data into deformation constraints for vertices of $T_{tet}(t)$, image features from time t are paired/correlated with vertices in the model. Each $v_i$ of $T_{tet}(t)$ is associated with the descriptor $dd_{k,t}^i$ from each $I_k(t)$ that is located closest to the projected location of $v_i$ in this respective camera. This computation is performed for all camera views and a feature association is discarded if $v_i$ is not visible from k or if the distance between the projected position of $v_i$ and the image position of $dd_{k,t}^i$ is too large. In this way, a set of associations $$A(v_i, t) = \{dd_{1,t}^{i1}, \ldots, dd_{K,t}^{iK}\}$$

is obtained for a subset of vertices that contains at most one feature from each camera. Next, the consistency of each $A(v_i, t)$ is assessed by comparing the pseudo-intersection point $P_i^{INT}$ of the reprojected rays passing through $u_{1,t}^{i1}, \ldots, u_{K,t}^{iK}$ to the 3D position of $v_i$ in model pose $T_{tet}(t)$. If the distance $$\|v_i - p_i^{INT}\|$$

is greater than a threshold $\epsilon_{DIST}$ the original feature association is considered implausible and $v_i$ is removed from the candidate list for deformation handles.

The next step is to establish temporal correspondence, i.e. to find for each vertex $v_i$ with feature association $A(v_i, t)$ the corresponding association $A(v_i, t+1)$ with features from the next time step. To this end, for each $dd_{k,t}^j \in A(v_i, t)$ a descriptor is preliminarily found $dd_{k,t+1}^f \in LD_{k,t+1}$ by means of nearest neighbor distance matching in the descriptor values, and add $dd_{k,t+1}^f$ to $A(v_i, t+1)$. In practice, this initial assignment is likely to contain outliers, and therefore the final set of temporal correspondences can be computed by means of robust spectral matching. For background information on spectral matching reference can be made to LEORDEANU, M., AND HEBERT, M. (2005) *A spectral technique for correspondence problems using pairwise constraints* In Proc. ICCV, which is fully incorporated herein by reference. Such methods efficiently bypass the combinatorial complexity of the correspondence problem by formulating it in closed form as a spectral analysis problem on a graph adjacency matrix. Incorrect matches are eliminated by searching for an assignment in which both the feature descriptor values across time are consistent, and pairwise feature distances across time are preserved.

Figure 3:
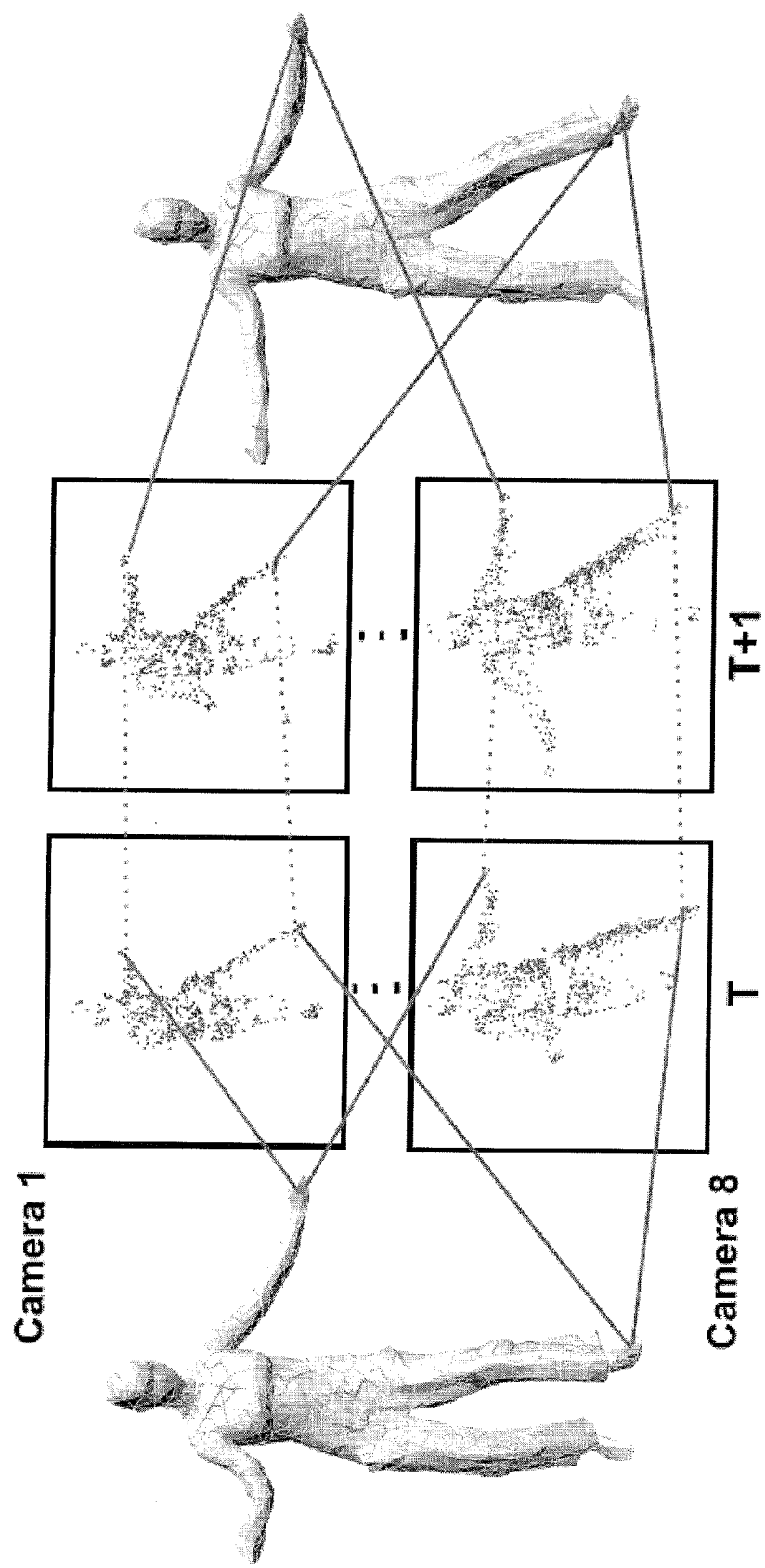
FIG. 3 shows three-dimensional correspondences extracted from corresponding Scale-invariant feature transform (SIFT) features in respective input camera views at t and t+1, consistent with an embodiment of the present invention.

FIG. 3 illustrates a subset of associations found for two camera views. From the final set of associations $A(v_i, t+1)$ the predicted 3D target position $p_i^{EST}$ of vertex $v_i$ is computed again as the virtual intersection point of reprojected image rays through the 2D feature positions. Each vertex $v_i$ for which a new estimated position is found is a candidate for a deformation handle. In certain specific embodiments, however, not all handles are straightforwardly applied to move directly to the new target pose. Instead, the following stepwise procedure is applied, which, in practice, is less likely to converge to implausible model configurations. From the set of regions R on the surface of the tet-mesh (as described above) and for each region $r_i \in R$, a handle is selected from all candidate handles that lie in $r_i$. This selected handle vertex $v_i$ is the handle vertex whose local normal is most collinear with the difference vector $p_i^{EST} - v_i$. If no handle is found for a region, the center of that region is constrained to its original 3D position in $T_{tet}(t)$. This prevents unconstrained surface areas from arbitrary drifting. For each region handle, a new intermediate target position is defined as $$q'_i = v_i + \frac{p_i^{EST} - v_i}{\|p_i^{EST} - v_i\|}.$$

Typically, position constraints $q'_i$ are obtained for around 70% to 90% of the surface regions R that are then used to change the pose of the model. This step-wise deformation is repeated until the multi-view silhouette overlap error $SIL(T_{tet}, t+1)$ cannot be further improved. The overlap error is computed as the XOR between input and model silhouette in all camera views.

The technique does not require tracking of features across the entire sequence which greatly contributes to the reliability of the method. The output of this step is a feature-based pose estimate $T_{tet}^F(t+1)$.

Figure 4A:
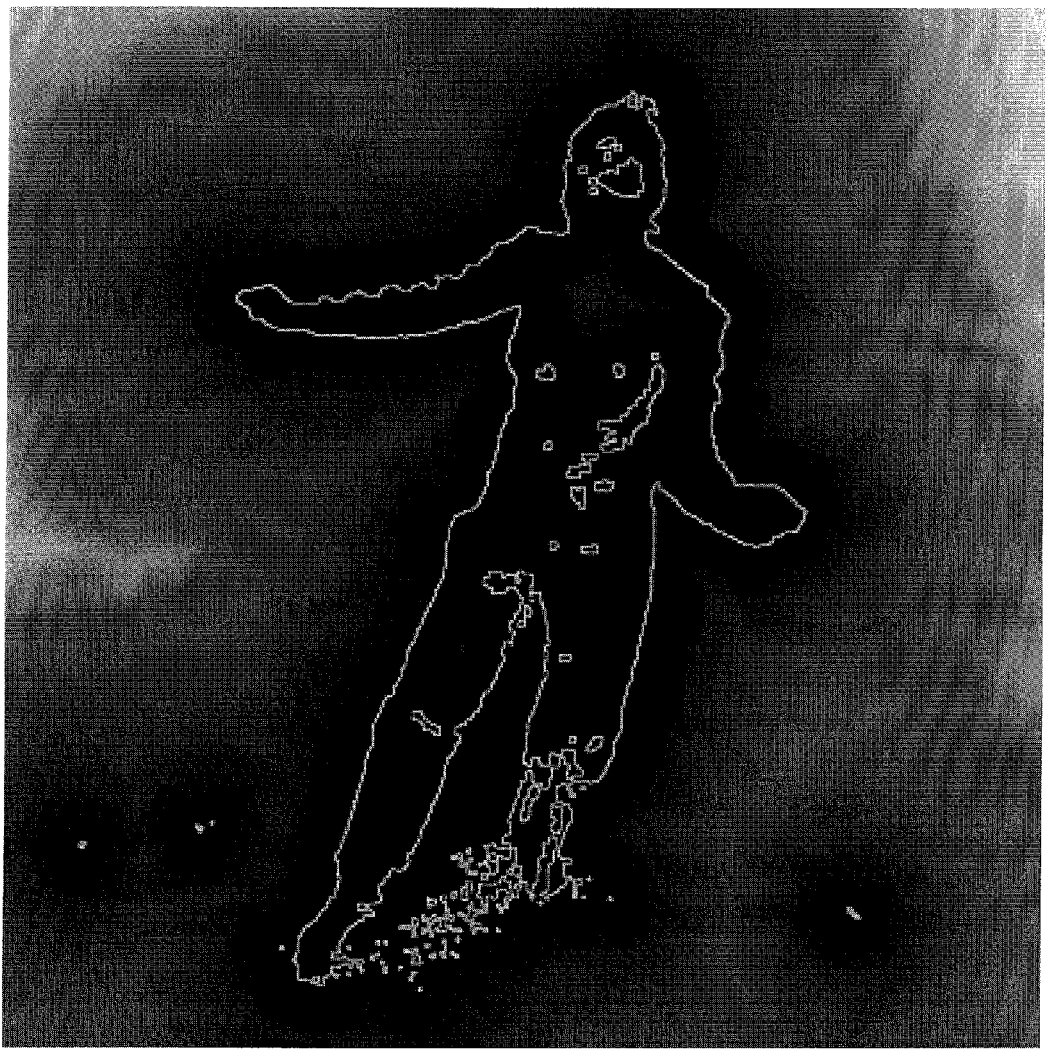
FIG. 4a shows a color-coded distance field from the image silhouette contour shown for one camera view, consistent with an embodiment of the present invention.
Figure 4B:
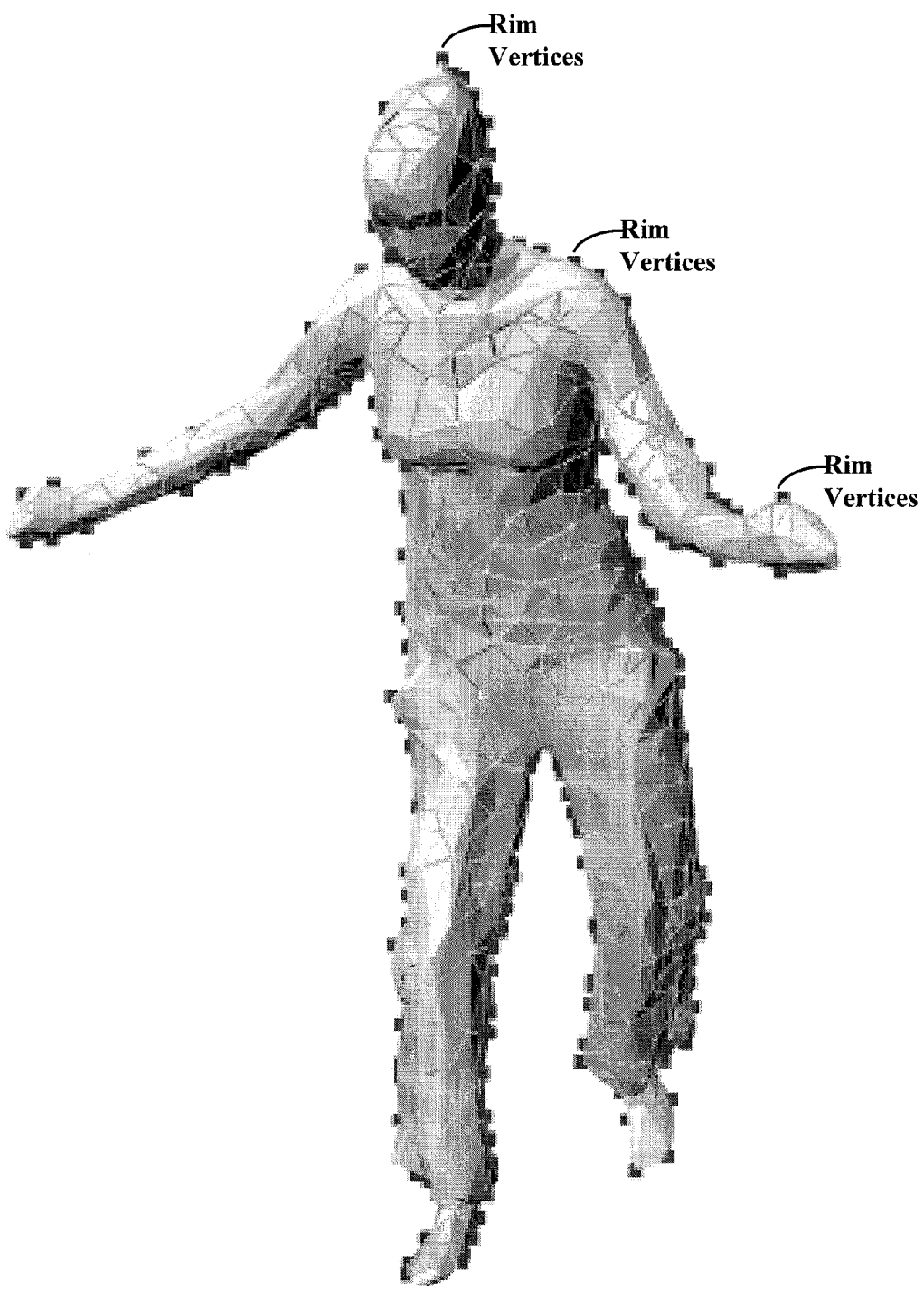
FIG. 4b shows rim vertices with respect to one camera view marked by enlarged dots on the 3D model, consistent with an embodiment of the present invention.

Aspects of the invention relate to refining the pose using silhouette rims. In image regions with sparse or low-frequency textures, it is possible that only few SIFT features are found. Consequently, the pose of $T_{tet}^F(t+1)$ may not be correct in all parts. Therefore, another constraint is implemented that is independent of image texture and has the potential to correct for such misalignments. To this end, additional deformation constraints are derived for a subset of vertices on $T_{tet}^F(t+1)$ (referred to as call rim vertices $V_{RIM}(t+1)$, see FIG. 4b). In order to find the elements of $V_{RIM}(t+1)$, contour images $C_{k,t}+1$ are first calculated using the rendered volumetric model silhouettes. A vertex $v_i$ is considered a rim vertex if it projects into close vicinity of the silhouette contour in (at least) one of the $C_{k,t}+1$, and if the normal of $v_i$ is perpendicular to the viewing direction of the camera k.

For each element $v_i \in V_{RIM}(t+1)$ a 3D displacement is computed by analyzing the projected location $u_{k,t+1}$ of the vertex into the camera k that originally defined its rim status. The value of the distance field from the contour at the projected location defines the total displacement length in vertex normal direction, FIG. 4a. In this manner, deformation constraints are obtained for rim vertices which are then applied in the same step-wise deformation procedure that was discussed infra. The result is a new model configuration $T_{tet}^{R'}(t+1)$ in which the projections of the outer model contours more closely match the input silhouette boundaries.

Aspects of the present invention relate to optimizing key handle positions. In many instances, the pose of the model in $T_{tet}^{R'}(t+1)$ is already close to a good match. However, in particular if the scene motion was fast or the initial pose estimate from SIFT was not entirely correct, residual pose errors remain. To accommodate, an additional optimization step is performed to correct such residual errors by globally optimizing the positions of a subset of deformation handles until good silhouette overlap is reached.

Instead of optimizing the position of all 1000-2000 vertices of the volumetric model, optimization can be performed for the position of typically 15-25 key vertices $V_k \in V_{tet}$ until the tetrahedral deformation produces optimal silhouette overlap. Tracking robustness is increased by designing the energy function such that surface distances between key handles are preserved, and pose configurations with low distortion energy $E_D$ are preferred. The user can be prompted to specify key vertices manually, a procedure that can be done only once for every model. Typically, key vertices are marked close to anatomical joints, and in case of model parts representing loose clothing, a simple uniform handle distribution produces good results. Given all key vertex positions $v_i \in V_k$ in the current model pose $T_{tet}^{R'}(t+1)$, optimization is performed for their new positions $p_i$ by minimizing the following energy functional:

$$E(V_k) = w_S \cdot SIL(T_{tet}(V_k), t+1) + w_D \cdot E_D + w_C \cdot E_C. \quad (4)$$

Here, $SIL(T_{tet}(V_k), t+1)$ denotes the multi-view silhouette overlap error of the tet-mesh in its current deformed pose $T_{tet}(V_k)$ which is defined by the new positions of the $V_k$. $E_D$ is the deformation energy. It follows that low energy configurations are more plausible. $E_C$ penalizes changes in distance between neighboring key vertices. All three terms are normalized and the weights $w_S$, $w_D$, and $w_C$ are chosen in a way such that $SIL(T_{tet}(V_k), t+1)$ is the dominant term. A Quasi-Newton Large-scale Bound-constrained or Unconstrained Optimization (LBFGS-B) method can be used to minimize Eq. (4). For background on such LBFGS-B methodology, reference can be made to BYRD, R., LU, P., NOCEDAL, J., AND ZHU, C. (1995) *A limited memory algorithm for bound constrained optimization*, SIAM J. Sci. Comp. 16, 5, 1190-1208, which is fully incorporated herein by reference. However, embodiments of the present invention can use other forms of an optimizer, such as gradient descent or probabilistic sampling methods.

Figure 5:
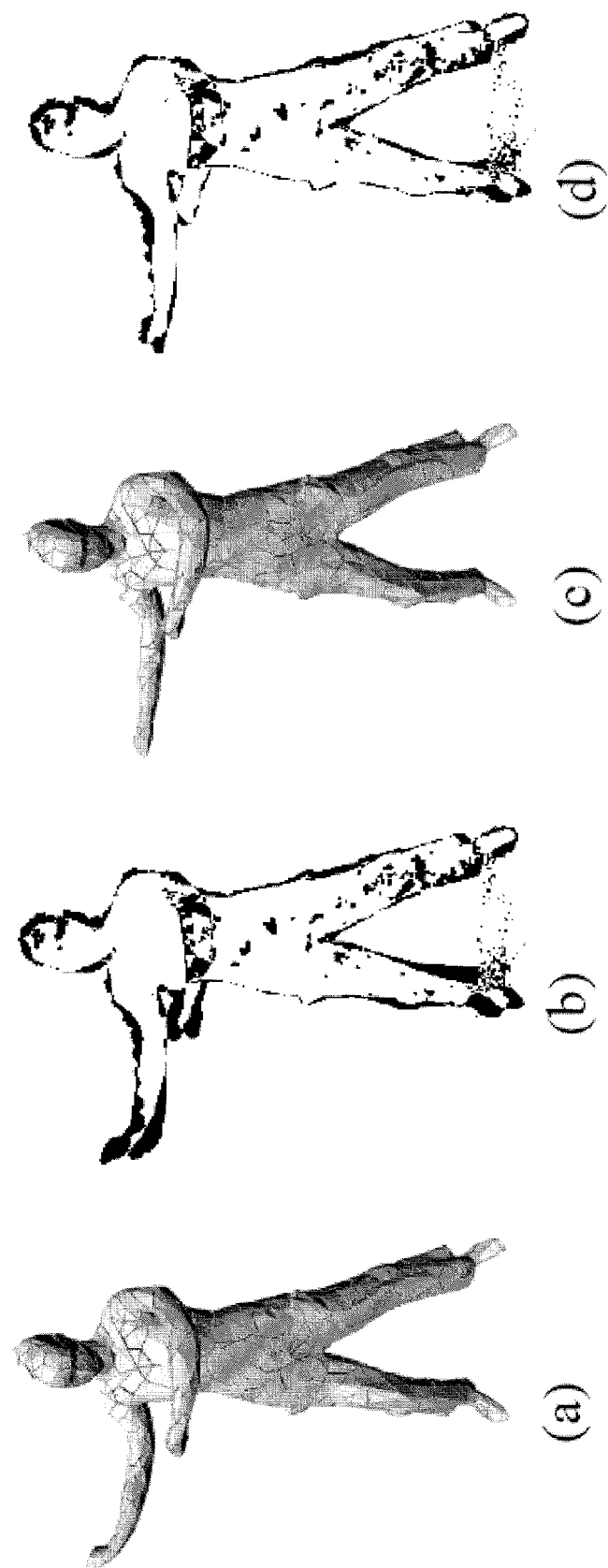
FIG. 5a shows a model and silhouette overlap, consistent with an embodiment of the present invention.
FIG. 5b shows overlap after the rim step, consistent with an embodiment of the present invention.
FIGS. 5c and 5d show that after key vertex optimization, these pose inaccuracies are removed and the model strikes a correct pose, consistent with an embodiment of the present invention.

FIG. 5 illustrates the improvements in the new output pose $T_{tet}^O(t+1)$ that are achieved through key handle optimization.

The above sequence of steps is performed for each pair of subsequent time instants. Surface detail capture commences after the global poses for all frames were found. Typically, the rim step described infra is performed at least once more after the last silhouette optimization steps, which, in some cases, leads to a better model alignment. A consistency check is also performed on the output of low frequency pose capture to correct potential self-intersections. To this end, for every vertex lying inside another tetrahedron, the volumetric deformation method is used to displace this vertex in outward direction along its normal until the intersection is resolved.

Once a global pose has been recovered for each frame, the pose sequence of $T_{tet}$ is mapped to $T_{tri}$. In the following, an example process of shape detail capture at a single time step is explained.

Aspects of the invention relate to an adaptation along silhouette contours. In a first step the silhouette rims of the fine mesh are adapted to better match the input silhouette contours. Because the surface mesh is already very close to the correct configuration, a much broader and less smooth range of deformations (relative to the volumetric case) can be allowed, thereby bringing the model into a much closer alignment with the input data. At the same time the constraints should be carefully selected, since noise in the data now has more deteriorating influence.

Figure 6A:
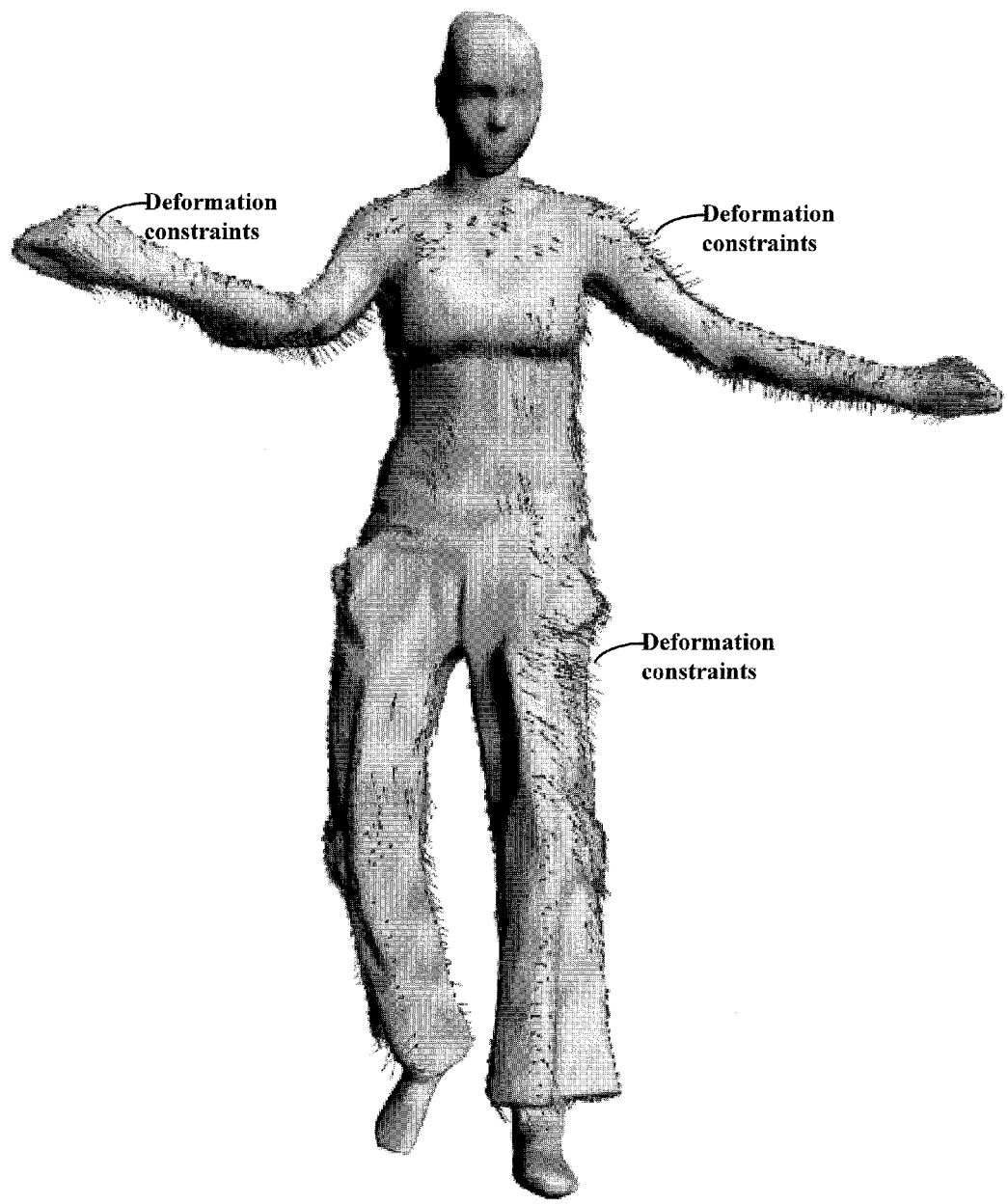
FIG. 6a shows capturing small-scale surface detail where the deformation constraints from silhouette contours are estimated, consistent with an embodiment of the present invention.

As discussed above, rim vertices can be calculated; however, they are calculated on the high resolution surface mesh, FIG. 6a. For each rim vertex the closest 2D point on the silhouette boundary is found in the camera view that defines its rim status. Next the image gradient at the input silhouette point is checked for an orientation that is similar to the image gradient in the reprojected model contour image. If this is the case, the back-projected input contour point defines the target position for the rim vertex. If the distance between back-projection and original position is smaller than threshold $E_{RIM}$, it is added as a constraint to Eq. (3). Here, a low weight (between 0.25 and 0.5 depending on the quality of the segmentation) is used for the rim constraint points. This has a regularizing and damping effect on the deformation that minimizes implausible shape adaptation in the presence of noise. After processing all vertices, the new surface is solved for. This rim projection and deformation step is iterated up to 20 times or until silhouette overlap cannot be further improved.

Aspects of the present invention involve model-guided multi-view stereo. Although the silhouette rims only provide reliable constraints on outer boundaries, they are usually evenly distributed on the surface. Hence, the deformation method in general nicely adapts the shape of the whole model also in areas which don't project on image contours. Unless the surface of the actor has a complicated shape with many concavities, the result of rim adaptation is already a realistic representation of the correct shape.

In order to recover shape detail of model regions that do not project to silhouette boundaries, such as folds and concavities in a skirt, photo-consistency information is used. To serve this purpose, additional deformation constraints are derived by applying the multi-view stereo. For background information on how to apply the multi-view stereo reference can be made to GOESELE, M., CURLESS, B., AND SEITZ, S. M. (2006) *Multiview stereo revisited* In Proc. CVPR, 2402-2409, which is fully incorporated herein by reference. Since the model is already close to the correct surface, the stereo optimization can be initialized from the current surface estimate and constrain the correlation search to 3D points that are at most ±2 cm away from $T_{tri}$.

In principle, any number of different multi-view stereo methods or shape-from-X methods can be used to recover fine time-varying detail on the final surface. Thus, the invention is not limited to the multi-view stereo method taught by Goesele. Indeed, a number of other multi-view stereo approaches or other shape-from-X approach, like shape-from-shading, shape-from-texture, and the like, could also be used, albeit with potentially higher computation cost. It is also possible to use at the refinement stage a combination of different techniques.

Figure 6B:
FIG. 6b shows additional deformation handles extracted from a 3D point cloud that was computed via model-guided multi-view stereo, consistent with an embodiment of the present invention.
Figure 6C:
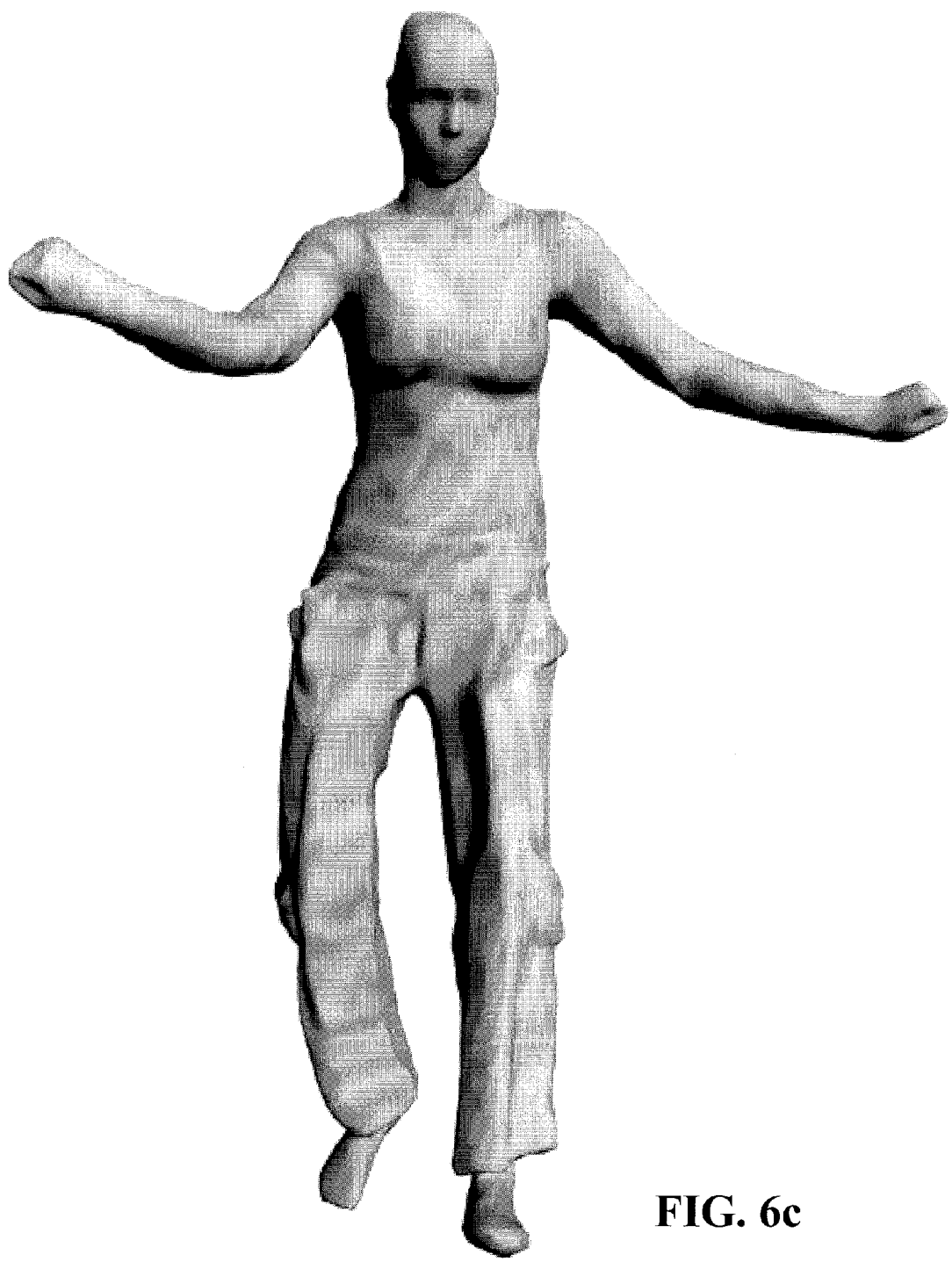
FIG. 6c shows that, together, both sets of constraints deform the surface scan to a highly accurate pose, consistent with an embodiment of the present invention.

As there are far less viewpoints of the subject than those taught by various other methods and the actors can wear apparel with little texture, the resulting depth maps (one for each input view) are often sparse and noisy. Nonetheless, they provide important additional cues about the object's shape. The depth maps are merged and produced by stereo into a single point cloud P, FIG. 6b, and thereafter project points from $V_{tri}$ onto P. For background information on how to perform such merging reference can be made to STOLL, C., KARNI, Z., ROSSL, C., YAMAUCHI, H., AND SEIDEL, H.-P (2006) *Template deformation for point cloud fitting* In Proc. SGP, 27-35, which is fully incorporated herein by reference. These projected points provide additional position constraints that can be used in conjunction with the rim vertices in the surface-based deformation framework, Eq. (3). Given the uncertainty in the data, the Laplace system is solved with lower weights for the stereo constraints.

Although not necessary for an understanding of various embodiments disclosed herein, the following discussion includes experimental results obtained from a specific implementation of one embodiment of the present invention.

Test data was recorded in the acquisition setup described above and comprised of 12 sequences that show four different actors and that feature between 200 and 600 frames each. To show the large application range of the algorithm, the captured performers wore a wide range of different apparel, ranging from tight to loose and made of fabrics with prominent texture as well as plain colors only. Also, the recovered set of motions ranges from simple walks, over different dance styles, to fast capoeira sequences. As shown in the images of FIGS. 1, 7 and 8, the algorithm faithfully reconstructs this wide spectrum of scenes. Although focused on human performers, the algorithm works equally well for animals or other objects for which a laser scan can be acquired.

FIG. 1 shows several captured poses of a very rapid capoeira sequence in which the actor performs a series of turn kicks. Despite the fact that in a 24 fps recording the actor rotates by more than 25 degrees in-between subsequent frames, both shape and motion are reconstructed at high fidelity. The resulting animation even shows deformation details such as the waving of the trouser legs. Furthermore, even with the plain white clothing that the actor wears in the input and which exhibits only few traceable SIFT features, the method performs reliably as it can capitalize on rims and silhouettes as additional sources of information. Comparing a single moment from the kick to an input frame confirms the high quality of the reconstruction, as shown by FIG. 7b (note that input and virtual camera views differ slightly).

The generated video also showed the captured capoeira sequence with a static checkerboard texture. This result demonstrates that temporal aliasing, such as tangential surface drift of vertex positions, is hardly noticeable, and that the overall quality of the meshes remains highly stable.

Figure 7A:
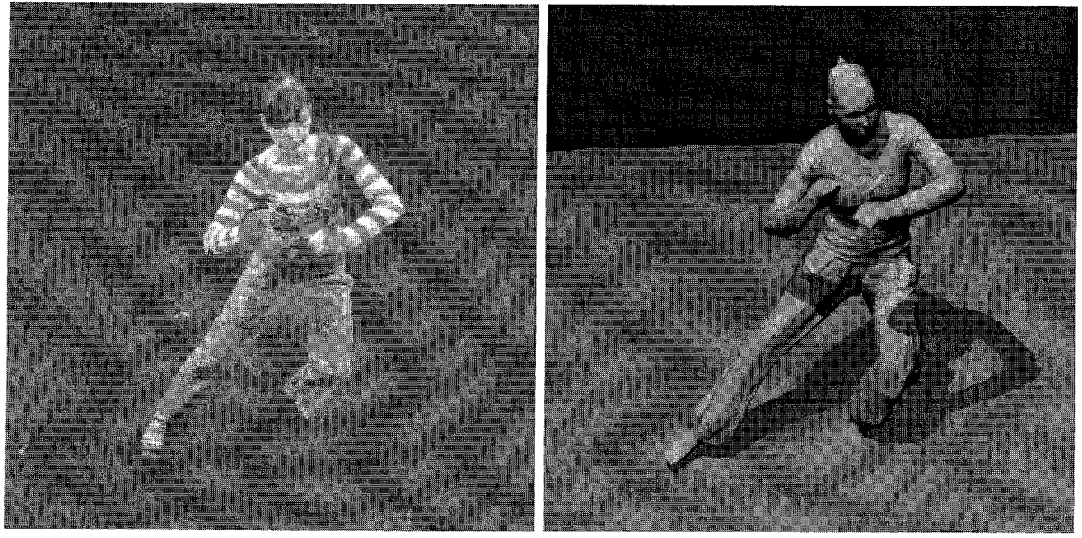
FIG. 7a shows a jazz dance posture with reliably captured inter-twisted arm motion, consistent with an embodiment of the present invention.
Figure 7B:
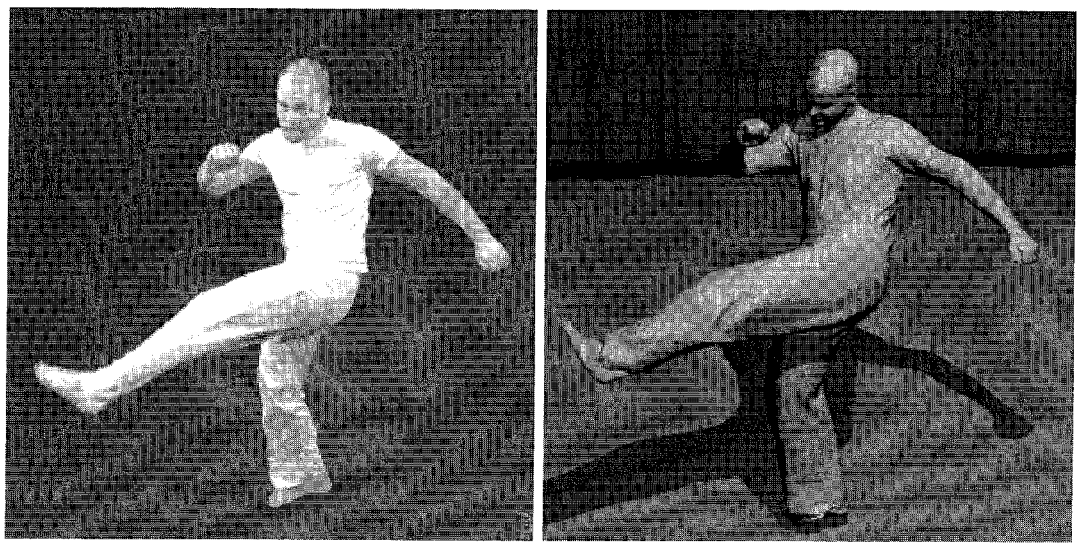
FIG. 7b shows a moment from a very fast capoeira turn kick where the input and virtual viewpoints differ minimally, consistent with an embodiment of the present invention.
Figure 8:
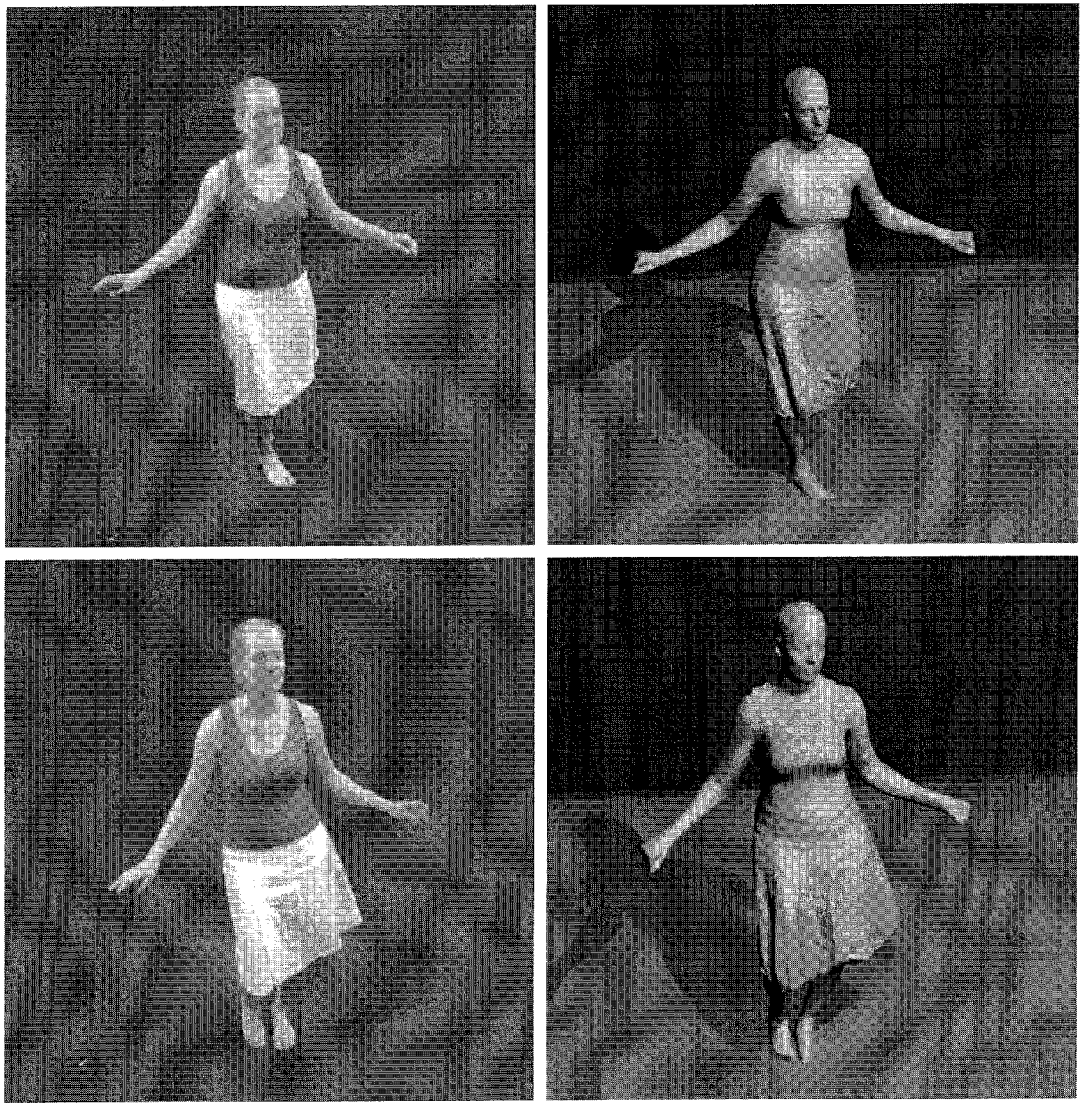
FIG. 8 shows a side-by-side comparison of input and reconstruction of a dancing girl wearing a skirt (input and virtual viewpoints differ minimally), consistent with an embodiment of the present invention.

In FIG. 7a one pose is depicted from a captured jazz dance performance. As the comparison to the input in image and video shows, it is possible to capture this fast and fluent motion. In addition, the many poses can also be reconstructed with complicated self-occlusions, such as the inter-twisted arm-motion in front of the torso, like in FIG. 7a.

FIG. 8 shows that the full time-varying shape of a dancing girl wearing a skirt can be captured. Even though the skirt is of largely uniform color, the results capture the natural waving and lifelike dynamics of the fabric. In all frames, the overall body posture, and also the folds of the skirt were recovered nicely without the user specifying a segmentation of the model beforehand. In these skirt sequences the benefits of the stereo step in recovering concavities are most apparent. In the other test scenes, the effects are less pronounced and therefore the stereo step was deactivated to reduce computation time. The jitter in the hands was slightly visible in some of the skirt sequences, likely due to the fact that the person moves with an opened hand but the scan was taken with hands forming a fist. In general, the final sequence of vertex positions was smoothed to remove any remaining temporal noise.

Table 1 (below) gives detailed average timings for each individual step in the experimental algorithm. These timings were obtained with highly un-optimized single-threaded code running on an Intel Core Duo T2500 Laptop with 2.0 GHz. Further optimizations would likely provide substantive improvement, and it is anticipated that parallelization can lead to a significant run time reduction. This specific implementation used a general purpose processor that included a storage medium configured such that when accessed by the processor, it performs the various steps discussed herein. Of course it would be recognized that a variety of processing circuits could be used to implement various functionality discussed herein. The various processing circuits can also include, but are not limited to, specially designed logic circuits, programmable logic arrays, multiple processors and combinations thereof.

TABLE 1

Average run times per frame for individual steps.

| Step | Time |
| --- | --- |
| SIFT step | ~34 s |
| Global rim step | ~145 s |
| Key handle optimization | ~270 s |
| Contour-based refinement | ~27 s |
| Stereo, 340 × 340 depth maps | ~132 s |

Figure 6D:
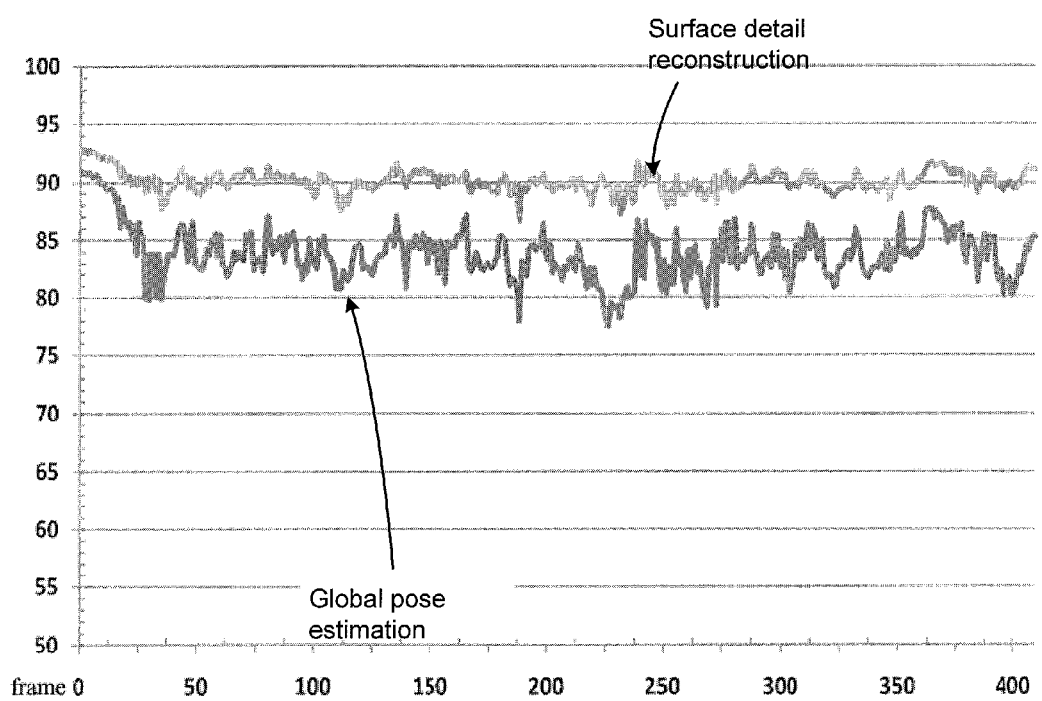
FIG. 6d depicts a graph of a per-frame silhouette overlap, as a percentage, after global pose estimation (lower line) and after surface detail reconstruction (upper line), consistent with an embodiment of the present invention.
Figure 6E:
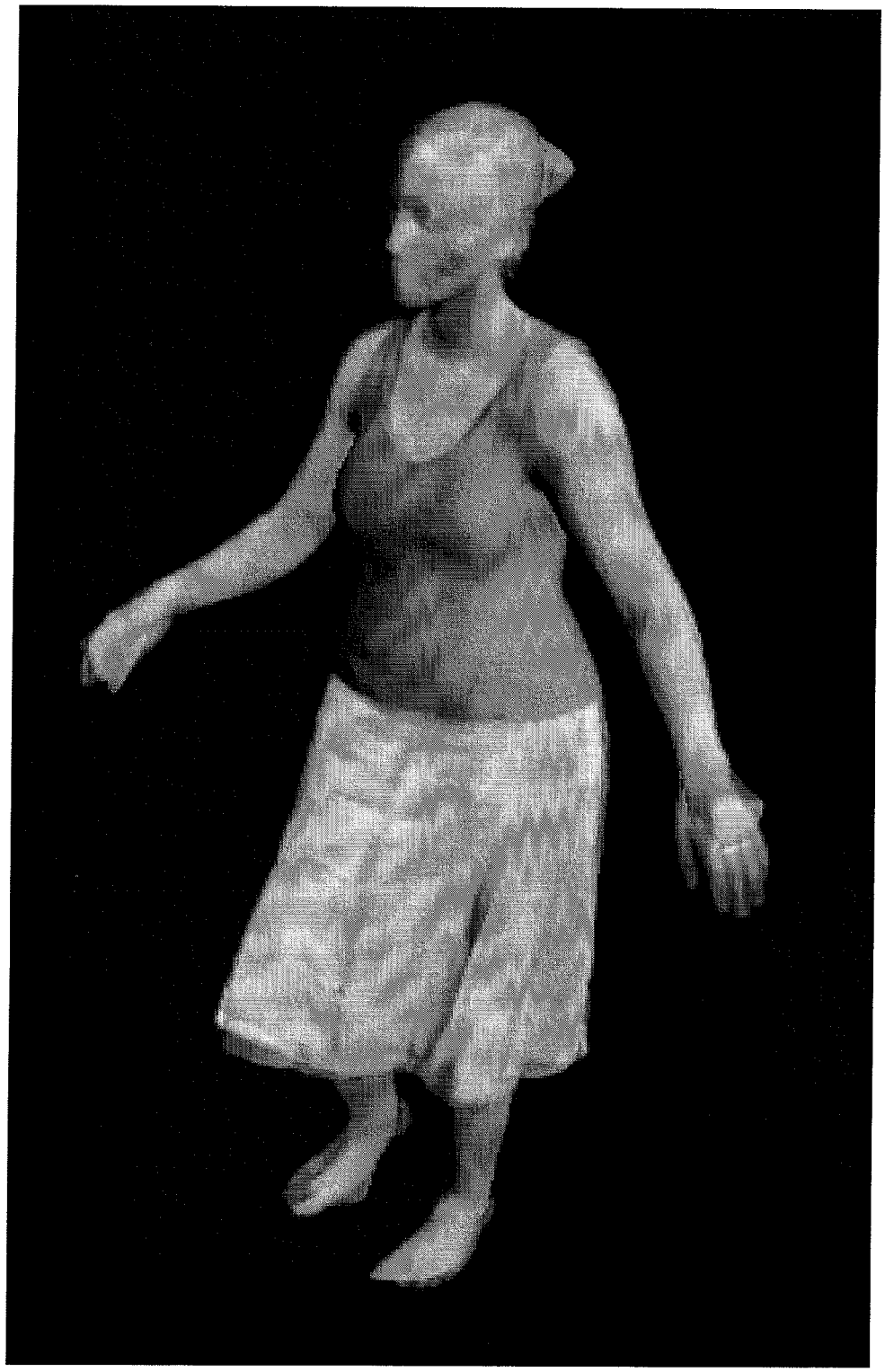
FIG. 6e shows a blended overlay between an input image and the reconstructed model showing the almost perfect alignment of the result, consistent with an embodiment of the present invention.

The high capture quality and the large application range and versatility of implementations of the present invention have been shown. To formally validate the accuracy, the overlap of the silhouette for the tracked output models was compared with the segmented input frames. This criterion was selected due to a lack of a gold-standard alternative capturing approach that would provide accurate time-varying 3D data. The re-projections of the final results typically overlap with over 85% of the input silhouette pixels, already after global pose capture only (lower curve in FIG. 6d). Surface detail capture further improves this overlap to more than 90% as shown by the upper curve. This measure is slightly negatively biased by errors in foreground segmentation in some frames that appear as erroneous silhouette pixels. Visual inspection of the silhouette overlap therefore confirms the almost perfect alignment of model and actual person silhouette. FIG. 6e shows a blended overlay between the rendered model and an input frame, which supports this point.

In accordance with certain examples, embodiments of the present invention robustly handle even noisy input, e.g., due to typically observed segmentation errors in the color-based segmentation. All 12 input sequences were reconstructed fully automatically after only minimal initial user input. As part of preprocessing, the user marks the head and foot regions of each model to exclude them from surface detail capture. Even slightest silhouette errors in these regions (in particular due to shadows on the floor and black hair color) would otherwise cause unnatural deformations. Furthermore, for each model the user once marks at most 25 deformation handles needed for the key handle optimization step.

In individual frames of two out of three capoeira turn kick sequences (11 out of around 1000 frames), as well as in one frame of each of the skirt sequences (2 frames from 850 frames), the output of global pose recovery showed slight misalignments in one of the limbs. Despite these isolated pose errors, the method recovers immediately and tracks the whole sequence without drifting—this means that such embodiments can run without supervision and the results can be checked afterwards. All observed pose misalignments were exclusively due to oversized silhouette areas because of either motion blur or strong shadows on the floor. Both of these could have been prevented by better adjustment of lighting and shutter speed, and more advanced segmentation schemes. In either case of global pose misalignment, at most two deformation handle positions had to be slightly adjusted by the user. At none of the over 3500 input frames processed, was it necessary to manually correct the output of surface detail capture.

For comparison, two related approaches were implemented from the literature. A method described in DE AGUIAR, E., THEOBALT, C., STOLL, C., AND SEIDEL, H.-P. (2007) *Marker-less deformable mesh tracking for human shape and motion capture* In Proc. CVPR, IEEE, 1-8, which is fully incorporated herein by reference, uses surface-based deformation and optical flow to track a deformable mesh from multi-view video. As indicated by the authors, optical flow fails for fast motions like the capoeira kicks, which makes tracking with their approach infeasible. In contrast, the volumetric deformation framework of the instant invention, in combination with the multi-cue analysis through-synthesis approach, captures this footage reliably. The method proposed in DE AGUIAR, E., THEOBALT, C., STOLL, C., AND SEIDEL, H. (2007) *Marker-less 3d feature tracking for mesh-based human motion capture* In Proc. ICCV HUMO07, 1-15, which is fully incorporated herein by reference, solves the slightly different problem of capturing continuous 3D feature trajectories from multi-view video without 3D scene geometry. However, as shown in this paper, the trajectories can be employed to deform a surface scan to move like the actor in video. Experiments found that it is hard for this method to maintain uninterrupted trajectories if the person moves sometimes quickly, turns a lot, or strikes poses with complex self-intersections. The embodiments of the present invention allow for robust handling of such situations. Furthermore, a stereo-based refinement step is performed that can be useful for improving contour alignment and for estimating true time-varying surface detail and concavities, which greatly contribute to the naturalness of the final result.

The current silhouette rim matching of embodiments of the present invention may produce erroneous deformations in case the topological structure of the input silhouette is too different from the reprojected model silhouette. However, in none of the test scenes was this found to be an issue. In other embodiments, more sophisticated image registration approaches are used to alleviate this issue entirely. For example, in certain implementations the images can be captured in a controlled studio environment while obtaining good segmentations, and other implementations (e.g., with more advanced background segmentation) enable the handling of outdoor scenes.

Figure 9C:
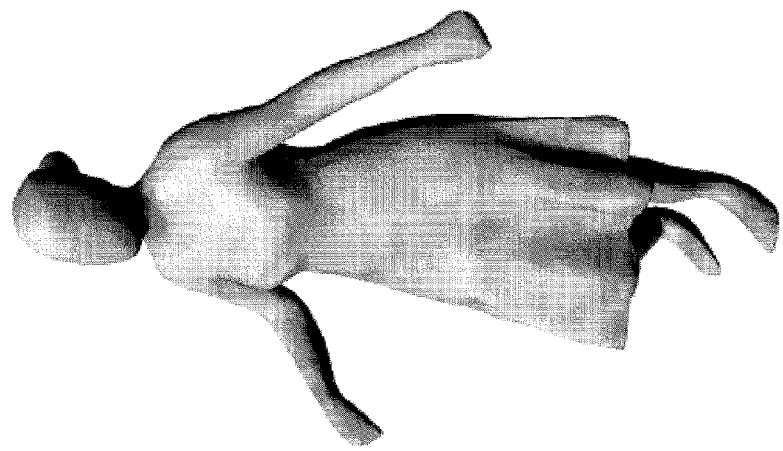
FIG. 9c shows a reconstruction using a coarse model, consistent with an embodiment of the present invention.
Figure 9B:
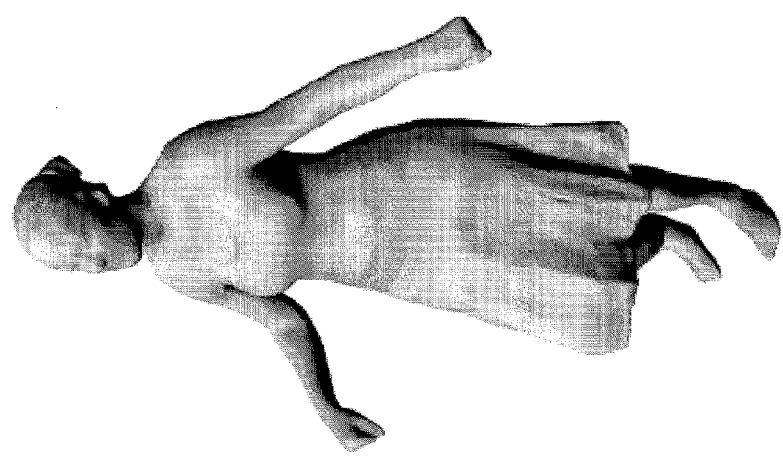
FIG. 9b shows a reconstruction using a detailed model, consistent with an embodiment of the present invention.
Figure 9A:
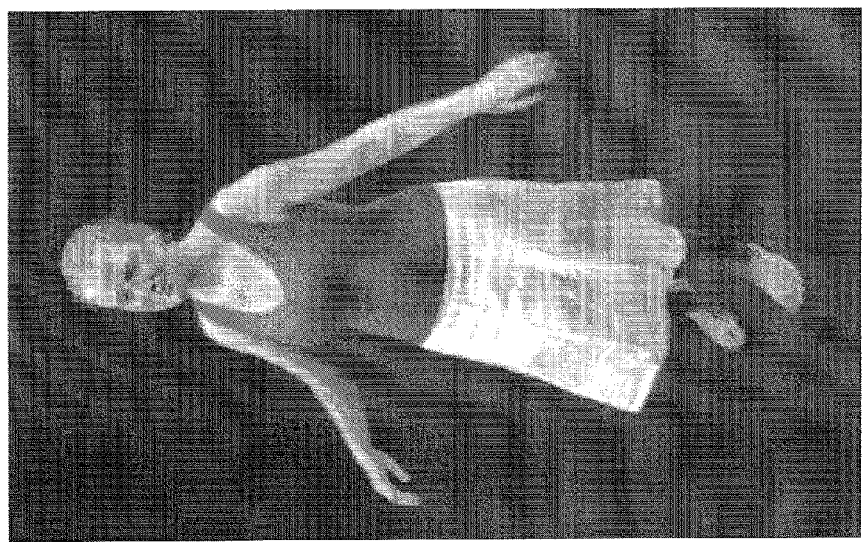
FIG. 9a shows an input frame, consistent with an embodiment of the present invention.

Moreover, there is a resolution limit to certain implementations of the above-described deformation capture techniques. Some of the high-frequency detail in the final result, such as fine wrinkles in clothing or details of the face, has been part of the laser scan in the first place. The deformation on this level of detail is not actually captured, but this fine detail is "baked in" to the deforming surface. To illustrate the level of detail reconstructed, a result was generated with a coarse scan that lacks fine surface detail. FIG. 9a shows an input frame. FIG. 9b shows reconstructions using the detailed scan. FIG. 9c shows reconstruction using the coarse scan. While, as noted before, the finest detail in FIG. 9c is due to the high-resolution laser scan, even with a coarse scan, the method still captures the important lifelike motion and deformation of all surfaces at sufficient detail. The importance of the detail capture step for the quality of the final result was supported by a video-based side-by-side comparison of the global pose recovery only, the final result with a coarse template, and the final result with the original detailed scan.

Also, in the system the topology of the input scanned model is preserved over the whole sequence. For this reason, surfaces with apparent topology that arbitrarily changed over time (e.g., the movement of hair or deep folds with self-collisions) were not tracked. Further on, although self-occlusions were prevented during global pose capture, they were not currently corrected in the output of surface detail capture. However, their occurrence is rather seldom. Manual or automatic correction by collision detection would also be feasible.

The volume-based deformation technique can essentially mimic elastic deformation, thus the geometry generated by the low-frequency tracking may in some cases have a rubbery look. For instance, an arm may not only bend at the elbow, but rather bend along its entire length. Surface detail capture eliminates such artifacts in general, and a more sophisticated yet slower finite element deformation could reduce this problem already at the global pose capture stage.

The experiments presented a new non-intrusive approach to spatio-temporally dense performance capture from video. It deliberately abandons traditional motion skeletons to reconstruct a large range of real-world scenes in a spatio-temporally coherent way and at a high level of detail.

The following discussion exemplifies the strengths and the usability of the algorithms in two practical applications that are important in media production.

One practical application involves 3D video. Since the approach can work without optical markings, the captured video footage and texture of the moving geometry from the input camera views can be used, for instance by using a blending scheme. For background on such a blending scheme reference can be made to CARRANZA, J., THEOBALT, C., MAGNOR, M., AND SEIDEL, H.-P (2003) *Free-viewpoint video of human actors* In Proc. SIGGRAPH, 569-577, which is fully incorporated herein by reference. The result is a 3D video representation that can be rendered from arbitrary synthetic views (see FIGS. 10*a* and 10*b*). Due to the highly-detailed underlying scene geometry the visual results are much better than with previous model-based or shape from silhouette-based 3D video methods.

Figures 10A, 10B, 10C:
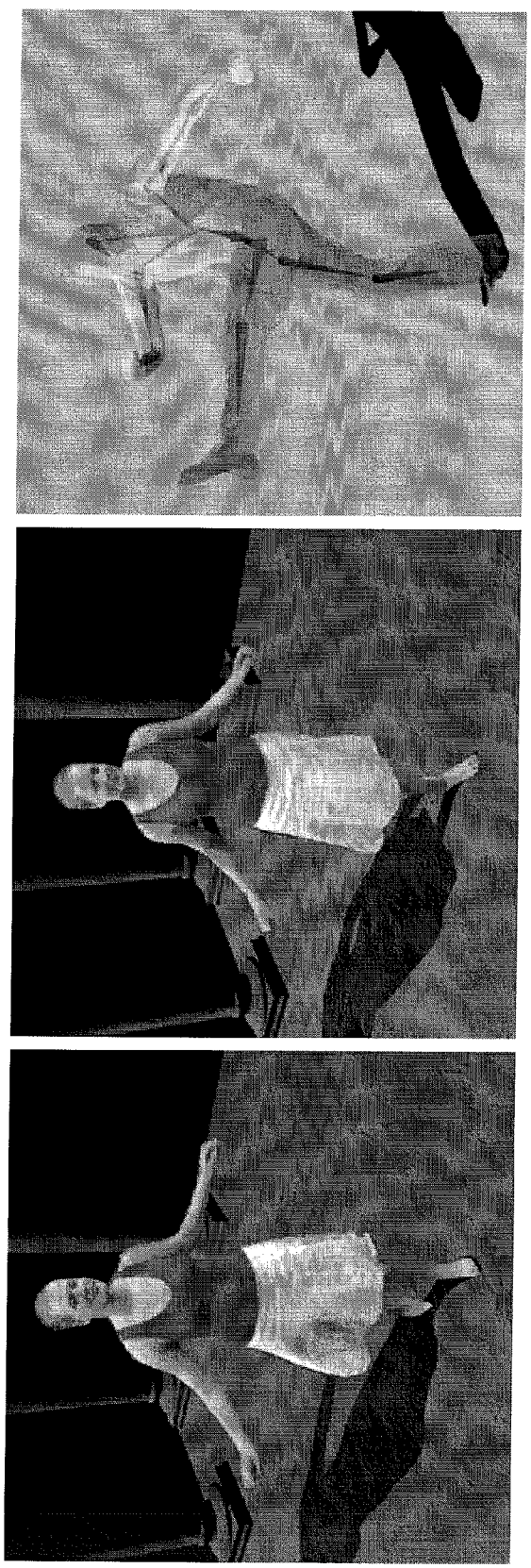
FIGS. 10a and 10b show a high-quality 3D Video rendering of a dancer wearing a skirt, consistent with an embodiment of the present invention.
FIG. 10c shows a fully-rigged character automatically estimated from a capoeira turn kick output, consistent with an embodiment of the present invention.

Another practical application involves reconstruction of a fully-rigged character. Since the method produces spatio-temporally coherent scene geometry with practically no tangential distortion over time, reconstruction is possible for a fully-rigged character, i.e., a character featuring an animation skeleton, a surface mesh and associated skinning weights, as shown by FIG. 10*c*, in case this is a suitable parametrization for a scene. To this end the result sequences are fed into the automatic rigging method that fully-automatically learns the skeleton and the blending weights from mesh sequences. For background information on such an automatic rigging method, reference can be made to DE AGUIAR, E., THEOBALT, C., THRUN, S., AND SEIDEL, H.-P. (2008) *Automatic conversion of mesh animations into skeleton based animations* Computer Graphics Forum (Proc. EurographicsEG'08) 27, 2 (4), 389-397, which is fully incorporated herein by reference. The experiment from this document shows that the data captured by the system can optionally be converted into a format immediately suitable for modification with traditional animation tools.

Implementations of the present invention capture from (unmodified) video streams the coherent dynamic geometry of people wearing arbitrary and even wide everyday apparel. Also, the approach is robust, requiring only a minimum of manual interaction and post-processing which leads to much lower production cost.

While rudimentary versions of the various methods can serve as a replacement for the current technology widely-used in movie and game productions, further refining can also be implemented. Software designed in accordance with embodiments of the present invention can seamlessly tie in with the existing equipment (laser scanner, camera, recording hardware and other data processing tools) that most production companies already use. In such context, the present invention can be implemented as methods, devices, systems, assemblies, stored software instructions for execution by a computer implementing such technique(s), stored data for access by a computer to facilitate a computer implementing such technique(s), and/or software-based packages; the skilled artisan would recognize that such implementation approaches are exemplified in the references cited and incorporated herein.

Accordingly, systems and embodiments implemented in manners consistent with the present invention are able to provide a complete type of animation representation. Consequently, many novel ways of working with the captured data become feasible. For instance, such systems and embodiments permit the addition of another component to the system that automatically rigs a captured performance, and/or that automatically fits a skeleton to the data such that they can be modified in animation software packages that are industry standard (e.g., Autodesk 3D Studio or Softimage). Other variations are discussed hereafter, without limitation.

One variation involves systems that vary the use of the number of video cameras for acquisition, as needed for a given application. According to the present invention, one experimental system uses eight video cameras for acquisition. However, this is not a hard design constraint and the system could produce results with as little as one or even many more than eight cameras. Ensuing differences manifest in the range of motions that can be captured, as well as in the quality of reconstruction; e.g., with lower quality of reconstruction if only few (or less) viewpoints are available. Also, the input sensors do not strictly need to be optical cameras only. Other embodiments use depth sensors, such as time-of-flight cameras (see, e.g., S. Burak Gokturk Hakan Yalcin, Cyrus Bamji *A Time-Of-Flight Depth Sensor—System Description, Issues and Solutions* (www.canesta.com), and Thierry Oggier et al., *SwissRanger SR3000 and First Experiences based on Miniaturized 3D-TOF Cameras* (http://www.mesa-imaging.ch/pdf/Application_SR3000_v1_1.pdf), each of which are fully incorporated herein by reference), structured light scanning devices (e.g., laser-triangulation scanners or systems using active pattern projection), and/or stereo-camera setups. Yet other embodiments use any combination of the above named depth sensor and video cameras.

The above-noted example system has been discussed in the context of human performers, but the system is also suitable to track animals or even mechanical devices.

While the above-noted example system has been discussed with use of a laser scanner to acquire a body model of the performer before actual recording starts, alternative forms of scanning or reconstruction technology can be used to acquire a surface or volume representation of the tracked subject. For instance, a model of the performer could be reconstructed from video, e.g., by using a shape-from-silhouette approach or a combination of shape-from-silhouette and stereo.

The above-noted experimental system uses the SIFT feature extraction algorithm but equally useful and suitable is any other algorithm that can establish correspondences between two adjacent time steps, either from images or from 3D geometry. Examples for alternative methods are any other sparse image feature matching method, any 3D feature matching method, as well as optical flow approaches in both 2D and 3D.

There are also alternative mesh deformation frameworks that would enable one to achieve similar results. Instead of a volumetric Laplacian framework, any variant of a full physically-based nonlinear deformation approach or finite-element method is applicable, albeit probably at the price of longer run-times. Any alternative surface deformation framework that can describe the deformation of the whole surface in terms of a few constraints would be an adequate replacement for the surface Laplacian algorithm. Again, run-time constraints and concerns about deformation quality may make such a replacement prohibitive for a given application.

The particular way of incorporating stereo constraints that are discussed herein is not the sole algorithm that could recover small-scale time-varying shape detail. Any of numerous multi-view stereo algorithms could also be used as a replacement, however at potentially lower reconstruction quality or at the price of higher computation times.

In specific embodiments, careful combining a low-frequency tracking step along with a high-frequency surface adaption step can robustly track the actor and clothes from the given input video. A low frequency tracking step is first implemented, which is a unique combination of image-(SIFT features) and silhouette-based (rim and overlap optimization) approaches combined with a volumetric deformation method simulating elastic object behavior, resulting in a robust technique for pose determination. The resulting pose is fed into the surface adaption stage of the algorithm, in which more image (multi-view stereo) and silhouette (rim optimization) features are fused with a robust Laplacian surface deformation method, allowing for a good reconstruction of the pose and shape of the observed actor.

Figure 11:
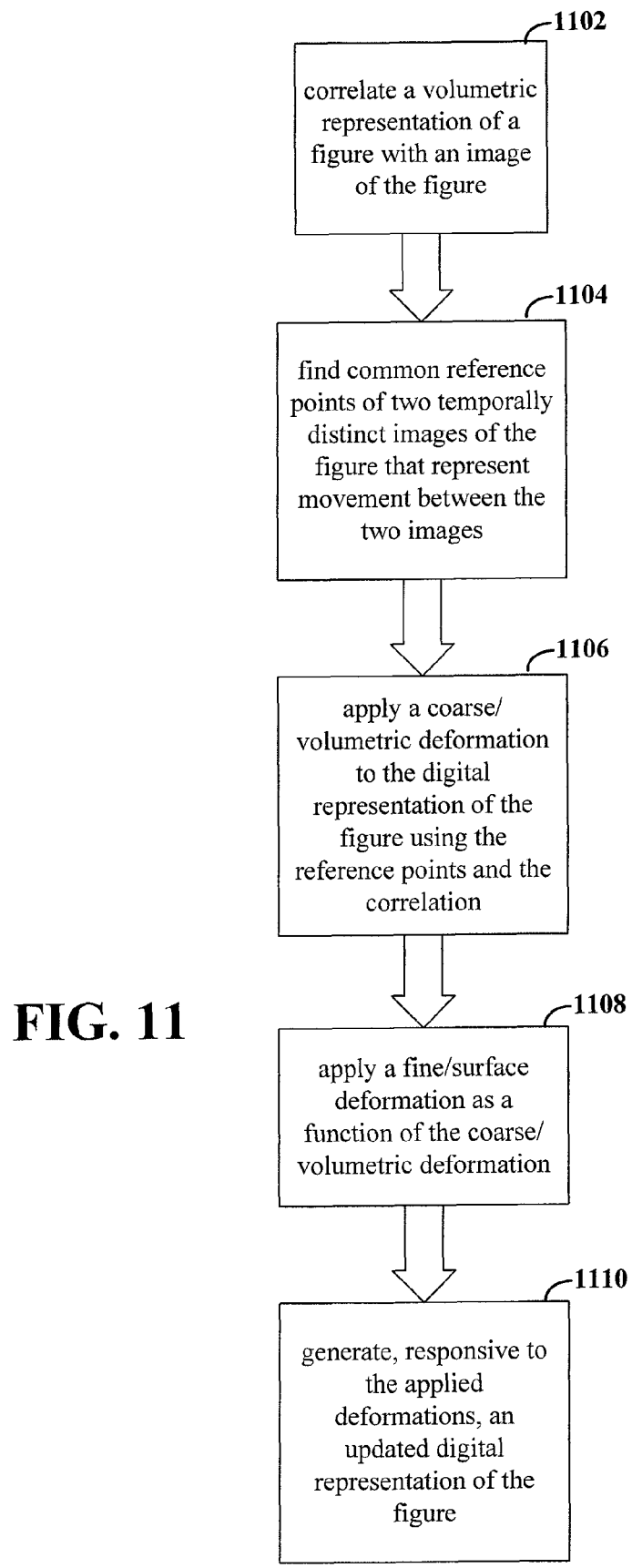
FIG. 11 shows a method for generating a digital representation of a figure, consistent with an embodiment of the present invention.

FIG. 11 shows a method for generating a digital representation of a figure, consistent with an embodiment of the present invention. At step 1102, an image of the figure is correlated with a volumetric representation of the figure. As discussed herein, one mechanism for accomplishing this includes laser-scanning of the figure to obtain a three-dimensional representation of the figure. A set of one or more spatially disparate images of the figure are also captured. To assist in correlating the volumetric representation and the image, the figure can be placed in similar positions for both the laser-scanning and the image capture. This can help assure that the differences are minimal therebetween.

At step 1104, common reference points are identified between two temporally distinct images. For example, video capture of the figure in motion can be obtained using a set of image capture devices/cameras. Movement of the figure between images of the video capture is represented by differences in the location of common reference points between images. According to a specific implementation, a subset of reference points is determined by excluding reference points that do not meet a set of criteria. One example of such criteria is to exclude a reference point that shows a significant deviation from an expected position of the reference point.

At step 1106, the selected set of reference points is used to perform a coarse/volumetric deformation of the figure. This can be accomplished as a function of the spatial movement of the reference points and a volumetric representation of the figure.

At step 1108, a fine/surface deformation is performed. This deformation takes into consideration the result of applying the coarse/volumetric deformation to the figure as well as using a fine-image resolution in the processing. Fine details captured during the laser-scanning can be modified according to the applied deformation and then are added into the representation of the figure.

At step 1110, a digital representation of the figure is generated from the results of the applied deformations. This representation can then be used to generate a corresponding image of the figure.

Many of the embodiments discussed herein are capable of reliably recreating a digital version of a figure from captured images without the use of a skeleton or other rigid modeling. However, these embodiments could be further modified for use in connection with a skeleton. For example, tracking of certain sub-parts of the subject could be assisted through use of a skeletal/rigid model. Parts known to deform rigidly can follow a rigid model, such as a skeleton, while other parts can be allowed to more freely deform. The flexibility of aspects of the deformation frameworks discussed herein allows for specification of such rigid segments in the deformation model, which is effectively like using a skeleton. This can be particularly useful to help increase tracking robustness in difficult tracing cases.

Various example embodiments of the present invention are directed to tracking of a single figure. Other embodiments, however, can track multiple figures in the same image. For example, a group of people can be tracked. In yet other example embodiments, portions of a single figure could be tracked individually. This could be particularly useful for detachable portions of the figure, such as a hat or a hand-held object.

Various embodiments discussed herein allow for reliable tracking/capture data without modifying the scene, i.e. without placing any form of marker in the scene that would simplify tracking of surface points over time but compromise the natural appearance. Notwithstanding, certain embodiments can use such fiducial markings. A few non-limiting examples of fiducial markings include reflective markers that show up in cameras, electronic markers that are detected by any other type of optical or non-optical sensor, any form of visible, invisible paint or the like. Generally speaking, any modification to the scene that helps determine how surface points move could be used as part of a fiducial marking. It is also possible to use a hybrid approach where only a few fiducial markers are provided and where many of the points of commonality between images are determined using markerless capture. For example, features can be extracted from natural clothing/surface texture in addition to the fiducial markers.

The various the approaches relating to video-based performance capture can be useful to produces a dense and feature-rich output format comprising of spatio-temporally coherent high-quality geometry, lifelike motion data, and optionally surface texture of recorded actors. The fusion of efficient volume- and surface-based deformation schemes, a multi-view analysis-through-synthesis procedure, and a multi-view stereo approach facilitates capture of performances of people wearing a wide variety of everyday apparel and performing extremely fast and energetic motion. These methods can be used to supplement and/or exceed the capabilities of marker-based optical capturing systems (as applicable for example to the movie (special effects and otherwise) and computer game industry), and can be useful for animators and CG artists by providing a high level of flexibility in acquiring and modifying real-world content. It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A processor-implemented method comprising:
generating a digital representation (R) of a figure by correlating a visual image of the figure with three-dimensional information about the figure, the digital representation of the figure including a two-dimensional surface mesh of the figure and a volumetric representation of the figure using a plurality of three-dimensional shapes;
finding, using markerless capture, reference points that are common to each of two temporally distinct visual images of the figure, the reference points representing movement of the figure between the two images;
correlating the reference points with vertices in the volumetric representation;
deforming, in response to positional constraints placed on the movement of the plurality of three-dimensional shapes between the two images, the volumetric representation of the figure as a function of the reference points and the correlated vertices to allow for characterization of three-dimensional movement of the plurality of three-dimensional shapes;

adjusting the deformation of the volumetric representation of the figure in response to a comparison of silhouette data from one of the two images to the volumetric representation;

deforming the surface mesh of the figure as a function of the volumetric deformation by mapping the deformation of the volumetric representation to the surface mesh based upon correlation between individual points in the surface mesh to multiple three-dimensional shapes of the plurality of three-dimensional shapes; and generating, responsive to the deformed two-dimensional surface mesh and to the deformed volumetric representation of the figure, an updated digital representation of the figure.

2. The method of claim 1, wherein the surface mesh includes a set of triangle shapes and the plurality of three-dimensional shapes includes tetrahedral shapes.

3. The method of claim 2, wherein the step of deforming the volumetric representation includes, for each tetrahedral shape, freedom of movement in three dimensions that is independent of a skeletal model of the figure.

4. The method of claim 1, wherein the step of generating a digital representation (R) further includes the step of generating the digital representation by:
characterizing a dense set of three-dimensional points (P) on a surface of R and connectivity between the points on the surface;
defining the figure via a set of coordinates for each point in P; and
characterizing a sparse volumetric version (V) of R representative of the shape of the figure in a reference pose, wherein V is represented as a set of tetrahedron vertices (Q) and poses are defined by a three-dimensional coordinate for each point in Q.

5. The method of claim 4, wherein the step of deforming the surface mesh of the figure further includes using a second set of point constraints constructed from a set of reference points different from the reference points from in the step of deforming the volumetric representation of the figure.

6. The method of claim 4, wherein the step of generating an updated digital representation of the figure includes the steps of:
defining, responsive to the deformed surface mesh and to the deformed volumetric representation of the figure, positional information about three-dimensional point constraints;
generating, responsive to the defined positional information, a captured performance model (M) representative of the geometry of the figure at respective times, wherein M includes a set of three-dimensional point positions for all points P of R at each respective time and a set of positions for each vertex Q of V; and
generating a representation (I) of an appearance at each time step corresponding to measurements from image sensors.

7. The method of claim 6, wherein the step of generating a representation (I) includes the step of using data from the image sensors including:
time-varying multi-view image data of the figure, features describing correspondence between surface points of the figure for temporally-different image data, and features describing a posture and a detailed surface appearance of the figure at each time step.

8. The method of claim 6, further including the steps of capturing a coarse pose of the figure at each time step by finding an optimal deformation for V in view of I; and
generating the model M by tracking the figure using a coarse pose estimate to compute a detailed surface estimate at each time step of a performance using a fine surface model of R.

9. The method of claim 4, further including the steps of estimating an animation model M using measurements from image sensors and without use of fiducial markers; and estimating parameters of M by alignment with a representation of a real world subject I.

10. The method of claim 1, further including passively reconstructing spatio-temporally coherent shape, motion and texture for a sequence of temporally distinct images.

11. The method of claim 1, wherein the step of deforming the volumetric representation includes preserving the shape of the digital representation locally such that the volume is preserved locally.

12. The method of claim 1, further including the steps of tracking at low-resolution to find reference points; and tracking at high-resolution to apply a fine deformation.

13. The method of claim 1, further including the steps of representing the figure as a set of three-dimensional shapes having a set of vertices; and
selecting a subset of the set of vertices as a function of a projected position of the set of vertices and a distance between the projected position and an actual position of the set of vertices.

14. The method of claim 1, wherein the step of applying a volumetric deformation includes accounting for non-rigidly deforming portions of the figure, the non-rigidly deforming portions moving substantially independently from rigidly deforming portions of the figure.

15. The method of claim 1, wherein the step of applying a volumetric deformation includes accounting for non-rigidly deforming portions of the figure, the non-rigidly deforming portions moving substantially independently from rigidly deforming portions of the figure by removing influences of a linear Laplacian deformation.

16. A device comprising:
a processing circuit configured and arranged for
generating a digital representation (R) of a figure by correlating a visual image of the figure with three-dimensional information about the figure, the digital representation of the figure including a surface mesh of the figure and a volumetric representation of the figure using a plurality of three-dimensional shapes;
finding, using markerless capture, reference points that are common to each of two temporally distinct visual images of the figure, the reference points representing movement of the figure between the two images;
correlating the reference points with vertices in the volumetric representation;
deforming, in response to positional constraints placed on the movement of the plurality of three-dimensional shapes between the two images, the volumetric representation of the figure as a function of the reference points and the correlated vertices to allow for characterization of three-dimensional movement of the plurality of three-dimensional shapes;
adjusting the deformation of the volumetric representation of the figure in response to a comparison of silhouette data from one of the two images to the volumetric representation;
deforming the surface mesh of the figure as a function of the volumetric deformation by mapping the deformation of the volumetric representation to the surface mesh based upon correlation between individual points in the surface mesh to multiple three-dimensional shapes of the plurality of three-dimensional shapes; and generating, responsive to the deformed surface mesh and to the deformed volumetric representation of the figure, an updated digital representation of the figure.

17. The device of claim 16, wherein the processing circuit is further for
using a low-resolution tracking approach to find reference points; and
using a high-resolution approach to apply the fine deformation.

18. The device of claim 17, wherein the processing circuit is further for determining a pose for the figure using a lower-detail model derived from the low-resolution tracking approach.

19. The device of claim 16, wherein the processing circuit is further for passively reconstructing spatio-temporally coherent shape, motion and texture for a sequence of temporally distinct images.

20. The device of claim 16, wherein the processing circuit is further for volumetrically deforming the volumetric representation of the figure independent from a skeleton of the figure and with, for each three-dimensional shape, freedom of movement in three dimensions.

21. The device of claim 16, wherein the processing circuit is further for volumetrically deforming the digital representation using a tetrahedral mesh modeling the figure.

22. The device of claim 16, wherein the processing circuit is further for
volumetrically deforming the volumetric representation of the figure in compliance with three-dimensional point constraints, and for
deforming the surface mesh in compliance with a volumetric model pose and additional three-dimensional point constraints.

23. The device of claim 16, wherein the processing circuit is further for selecting vertices from a set of all vertices of the three-dimensional shape, as a function of a projected position of the set of all vertices and a distance between the projected position and an actual position of the set of all vertices.

24. The device of claim 16, wherein the processing circuit is further for, during the step of deforming the volumetric representation, accounting for non-rigid deforming portions of the figure, the non-rigid deforming portions of the figure moving substantially independent from movement of rigidly deforming portions of the figure.

25. A non-transitory-storage medium containing stored data that when accessed causes a processing circuit to perform the steps of:
generating a digital representation (R) of a figure by correlating a visual image of the figure with three-dimensional information about the figure, the digital representation of the figure including a surface mesh of the figure and a volumetric representation of the figure using a plurality of three-dimensional shapes;
finding, using markerless capture, reference points that are common to each of two temporally distinct visual images of the figure, the reference points representing movement of the figure between the two images;
correlating the reference points with vertices in the volumetric representation;
deforming, in response to positional constraints placed on the movement of the plurality of three-dimensional shapes between the two images, the volumetric representation of the figure as a function of the reference points and the correlated vertices to allow for characterization of three-dimensional movement of the plurality of three-dimensional shapes;
adjusting the deformation of the volumetric representation of the figure in response to a comparison of silhouette data from one of the two images to the volumetric representation;
deforming the surface mesh of the figure as a function of the volumetric deformation by mapping the deformation of the volumetric representation to the surface mesh based upon correlation between individual points in the surface mesh to multiple three-dimensional shapes of the plurality of three-dimensional shapes; and
generating, responsive to the deformed surface mesh and to the deformed volumetric representation of the figure, an updated digital representation of the figure.

26. The storage medium of claim 25, wherein the stored data when accessed further causes a processing circuit to perform the steps of
volumetrically deforming the volumetric representation of the figure in compliance with three-dimensional point constraints, and
deforming the surface mesh in compliance with a volumetric model pose and additional three-dimensional point constraints.

27. The storage medium of claim 25, wherein the stored data when accessed further causes a processing circuit to perform the step of preserving a local shape for maintaining the volume of the figure.

* * * * *